United States Patent [19]
Ludwig et al.

[11] Patent Number: 6,006,230
[45] Date of Patent: Dec. 21, 1999

[54] DATABASE APPLICATION DEVELOPMENT SYSTEM WITH IMPROVED METHODS FOR DISTRIBUTING AND EXECUTING OBJECTS ACROSS MULTIPLE TIERS

[75] Inventors: Patrick B. Ludwig, Duxbury; Scott P. Marlow, Andover, both of Mass.

[73] Assignee: Sybase, Inc., Emeryville, Calif.

[21] Appl. No.: 08/791,800

[22] Filed: Jan. 29, 1997

Related U.S. Application Data

[60] Provisional application No. 60/035,336, Jan. 15, 1997.

[51] Int. Cl.$^6$ ........................................................ G06F 17/30
[52] U.S. Cl. ........................... 707/10; 707/103; 707/102; 395/701; 395/710
[58] Field of Search ..................... 707/102, 103, 707/104, 10; 395/701, 710

[56] References Cited

U.S. PATENT DOCUMENTS

| | | | |
|---|---|---|---|
| 5,206,951 | 4/1993 | Khoyi et al. | 709/303 |
| 5,226,161 | 7/1993 | Khoyi et al. | 709/303 |
| 5,261,080 | 11/1993 | Khoyi et al. | 710/65 |
| 5,303,379 | 4/1994 | Khoyi et al. | 395/710 |
| 5,325,524 | 6/1994 | Black et al. | 707/10 |
| 5,410,688 | 4/1995 | Williams et al. | 707/10 |
| 5,421,012 | 5/1995 | Khoyi et al. | 709/107 |
| 5,421,015 | 5/1995 | Khoyi et al. | 709/107 |
| 5,566,330 | 10/1996 | Sheffield | 707/4 |
| 5,625,818 | 4/1997 | Zarmer et al. | 707/104 |
| 5,634,010 | 5/1997 | Ciscon et al. | 395/200.53 |
| 5,634,124 | 5/1997 | Khoyi et al. | 475/123 |
| 5,642,511 | 6/1997 | Chow et al. | 395/701 |
| 5,687,370 | 11/1997 | Garst et al. | 707/206 |
| 5,692,183 | 11/1997 | Hapner et al. | 707/103 |
| 5,724,588 | 3/1998 | Hill et al. | 395/684 |
| 5,732,257 | 3/1998 | Atkinson et al. | 707/4 |
| 5,764,897 | 6/1998 | Khalidi | 395/200.31 |
| 5,764,977 | 6/1998 | Oulid-Aissa et al. | 707/10 |

*Primary Examiner*—Anton Fetting
*Assistant Examiner*—Greta L. Robinson
*Attorney, Agent, or Firm*—John A. Smart

[57] ABSTRACT

A database client/server development system providing support for remote sessions with user-created application objects is described. When a user desires to create a "remoteable" object from a user object, the user assigns a proxy name or alias, thereby providing a mechanism to differentiate the real (local) version of the object from a remote version of that object. When the user creates the proxy, the system generates all of the interface definitions for the object (i.e., to access its internal functionality) which are capable of being proxied (i.e., "proxiable"). A given object can reside locally, remotely, or both; the proxy mechanism allows the application to resolve at runtime which version of the object to invoke. When the user's final application is deployed, the proxy object is deployed at the client machine for use at the client for accessing the real version at the server. If desired, an application can be deployed with a real copy of the object, in addition to the proxy. In such a case, the client can serve as a server (of that object), in addition to being a client of objects from other servers.

35 Claims, 7 Drawing Sheets

Microfiche Appendix Included
(1 Microfiche, 43 Pages)

DATABASE APPLICATION DEVELOPMENT SYSTEM WITH IMPROVED METHODS FOR DISTRIBUTING AND EXECUTING OBJECTS ACROSS MULTIPLE TIERS

The present application claims priority from commonly-owned provisional patent application serial No. 60/035,336, filed Jan. 15, 1997, and entitled DATABASE APPLICATION DEVELOPMENT SYSTEM WITH IMPROVED METHODS FOR DISTRIBUTING AND EXECUTING OBJECTS Accoss MULTIPLE TIERS, the disclosure of which is hereby incorporated by reference.

MICROFICHE APPENDIX

A single-fiche Microfiche Appendix A, containing 43 frames, is included with this application.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to computerized database systems and, more particularly, to a system and methods for improving distribution and execution of objects, including application objects, across multiple tiers of distributed computer environments.

Today, client/server systems abound. Such systems are characterized by a database server(s) connected to a multitude of clients, each client typically comprising a workstation or personal computer (PC) connected to a network. In a typical deployment of such a system, a client application, such as one created by an information service (IS) shop, resides on all of the client or end-user machines. Such client applications interact with host database engines (e.g., Sybase SQL Server™), executing business logic which is mostly, if not completely, running at the client machines. Moreover, with present-day systems, it is possible for a client to take advantage of centralized business logic residing at the host database, typically written in the host database's proprietary or semi-proprietary language (e.g., Sybase T-SQL).

One approach to providing better distributed computing is to employ existing Distributed Computing Environment Remote Procedure Calls (DCE\ RPCs). Using such an environment, one can store C programming code on a server, thus providing a centralized repository for business logic. Such an approach is problematic, however. At the outset, the difficulty of configuring such a Distributed Computing Environment is a daunting task, requiring highly skilled technicians (not only for installation but also maintenance). Further, most IS professionals charged with the task of creating database applications, although quite adept at developing client applications, have relatively little training or experience providing server-side logic. For instance, most of these individuals typically employ fourth-generation languages (4GL), such as Powersoft PowerScript~, Paradox PAL™, Microsoft Visual Basic™, or the like. As a result, a minority of these individuals are adept at creating program logic in a lower-level language, such as C.

A particular problem exists with implementing a substantial amount of business logic on the client side. Over a period of time, a given database application can be expected to undergo various modifications, as that program undergoes further enhancements. Moreover, the business environment is a dynamic one. Accordingly, a program implementing business logic will expectedly undergo significant modifications over a period of time for adapting to ever-changing business logic. When the business logic requiring modification resides on the client side, the task of updating business logic includes the arduous task of updating each individual client machine. Given the difficulty of maintaining business logic at multiple clients (particularly in a large network environment), there is much interest in maintaining business logic in a centralized location.

Another difficulty in client/server environments is the disparity in capability from one client machine to another. Such environments are typically very heterogeneous, ranging from very powerful workstations on the one hand, to very limited or modest workstations on the other. Given such an environment, it is difficult, if not impossible, to deploy a large, complex application on all of these different client machines. In practice, one is limited by the lowest common denominator. Quite simply, the differences between the client machines make it extremely difficult to deploy a single application across such an environment.

One approach to addressing the foregoing problems is DCE or Distributed Computing Environment protocol—an emerging standard. To date, this "standard" has been difficult to implement and maintain (in addition to being a somewhat immature standard). In particular, the difficulty faced in implementing and maintaining the server side of such an environment remains an obstacle to widespread adoption. DCE is an RPC-based (i.e., Remote Procedure Call-based) solution where a portion of procedure calls are abstracted: an interface definition resides at the client with a corresponding interface definition residing at a receiver (i.e., remote computer, typically a server, which services the RPC calls). The task of coordinating a collection of servers in a DCE environment is an especially difficult one.

Another emerging standard is CORBA (Common Object Request Broker Agent), an object-based RPC-like standard. Like the DCE approach, CORBA provides a mechanism where two processes can communicate remotely, through a well-defined interface. Microsoft OLE (Object Linking and Embedding), a competing standard, also implements remote interprocess communication, through a well-defined interface. Although such standards have been proposed, with varying levels of maturity, to date there remains few tools available which would facilitate use of any one of these standards. Further, each standard incorporates proprietary technology, thus limiting the ability of these environments to interoperate with each other.

Implementing centralized business logic at a server is not itself without disadvantages, however. For departmental solutions, IS personnel desire to retain at least some control over a deployed application. With a centralized system, depending on how it is administered, clients may take offense to centralization of control if service is perceived as inadequate. The increasing popularity of "departmental computing" is, in large part, a response to the "glass house"—overly centralized computing. For departmental solutions, therefore, IS personnel want to retain at least some control. Although these individuals recognize the benefit of partitioning the business logic of an application, these individuals want to retain control—physical access—over machines which implement at least some of the business logic.

The cost of administering a centralized service greatly affects how well clients are serviced. As it is typically very expensive to employ skilled technicians for changing to business logic stored on a server (e.g., requiring expert C programmers), upper management is often unwilling to fund such changes. For departmental solutions, therefore, keeping the cost of modifications relatively low is an important consideration.

What is needed is a system with methods providing an n-tier development environment. Such a system would allow a programmer to create objects that contain business rules and which can be distributed onto one or more application servers, without any inherent limit as to how many servers can be employed. The present invention fulfills this and other needs.

SUMMARY OF THE INVENTION

A database client/server development system providing support for remote sessions with user-created application objects is described. When a user desires to create a "remoteable" object from a user object, the user assigns a proxy name or alias, thereby providing a mechanism to differentiate the real (local) version of the object from a remote version of that object. When the user creates the proxy, the system generates all of the interface definitions for the object (i.e., to access its internal functionality) which are capable of being proxied (i.e., "proxiable"). A given object can reside locally, remotely, or both; the proxy mechanism allows the user's application to resolve at runtime which version of the object to invoke. When the user's final application is deployed, the proxy object is deployed at the client machine for use at the client for accessing the real version at the server. If desired, an application can be deployed with a real copy of the object, in addition to the proxy. In such a case, the client can serve as a server (of that object), in addition to being a client of objects from other servers.

The deployed application or client application resides on the client machine.

Execution begins with the client creating a connection object, i.e., executing a "create connection" script statement. This creates an object representing a connection to a server. In response to this command, a runtime engine (PowerBuilder Runtime Engine or RTE) instantiates a "create connection" object and, additionally, invokes a CreateConnectObject handler, at a remote object manager. This action leads to invocation of a generic service manager, specifically invoking its ConnectToServer handler which establishes the necessary server connection, using a Communications and Service driver. Various attributes or properties of the connection object are set at the client, followed by the actual call to ConnectToServer. The attributes themselves specify a particular driver (e.g., Winsock), as well as server location and application name. The ConnectToServer call on the connection object leads to invocation of the remote object manager's SetConnect handler.

The user's object—typically a "non-visual object" (NVO)—is created at the client as follows. A "create remote user" object statement is executed at the client; this creates the proxy object in the client's local space. At this point, the proxy object is not usable; first, it must be associated with a server. This is done by the SetConnect call. In particular, the call associates the proxy object (previously instantiated) with the server. This leads to, in turn, invocation of a CreateRemoteObject handler. As a result, the system attempts to instantiate the corresponding object at the server side. When the real object is instantiated at the server, it is created with the same properties and methods for which corresponding stubs were created at the proxy. Actual invocation of the remote object's method leads to invocation of a InvokeRemoteMethod handler. In essence, the proxy object (corresponding stub) passes the invocation request to the InvokeRemoteMethod handler, including passing it all relevant parameters. When the call is passed over to the service manager, the call is processed in a generic fashion. Here, the information is translated into a representation for each of the possible types of remote invocation calls, thereby packaging the call for the communication layer to transport.

The remote object manager serves to translate information to and from the client application and the service manager. This bi-directional translation module will, when appropriate, invoke error handlers at the client application. The remote object manager includes handlers which correspond to commands in the PowerScript language (in PowerBuilder, from Powersoft of Concord, Mass.). The service manager, on the other hand, provides an interface of internal functions, invoked by the remote object manager, for taking information in PowerBuilder's internal object form and creating a generic interface that represents the same information (e.g., accessible from a buffer).

The service manager interface functions provide an API (Application Programming Interface) for supporting invocation of remote methods. CreateInterface and DestroyInterface manage creation and destruction of an interface for a method call, respectively. Internally, remote method calls are supported by a linked list of items. Management of the list is provided by AddInterfaceitem and UpdateInterfaceItem. Parameter data is processed by MarshallMethodParams and UnmarshallMethodParams. Traversal of the list is provided by GetFirst/NextInterfaceItem. Collectively, the API functions to pass method invocations, with appropriate parameter information, to the communication layer. Hierarchical information from the item list is "flattened" into a linear byte stream.

Communication on the client side is straightforward. The appropriate driver (e.g., Winsock (TCP/IP), Sybase Open Client, Named Pipes, or the like) is initialized. The selected driver, in turn, undertakes send/receive actions. The server, in turn, "listens" for messages from the client. On the server, there exists a corresponding object for the connection object—the transport object. The transport object is, in an analagous manner, created using a PowerScript create statement. Once created, properties for the transport object are set according to the connection profile, including application name and type of communication supported. The server is created in a manner analagous to that of the client application. Specifically, the PowerScript includes code for creating and instantiating a transport object. This object, in turn, functions as the "listener" for the client. Each request for a connection from a client initiates a session for that client in its own thread space at the server.

The server includes modules which complement those of the client. Interface functions of the server represents a corresponding set of interface functions on the server side. These function to build a representation of the information suitable for processing at the server. For listening and responding to clients, the server includes a Communications and Service driver having a thread manager. Multi-tasking is handled by the server-side Communications and Service driver. As a result, management of multiple client threads and the pool of available threads occurs at the level of the driver. Similarly, corresponding to the client's service manager is the server's service manager. The entry point into the service manager is a ServiceManager call. This provides the communication drivers with a single point of entry at the server. The StartService call responds to a server listen event. ConnectClient services the client's request to "ConnectToServer." In a corresponding manner, DisconnectClient drops the connection. ServerCreateObject and ServerInvokeObjectMethod correspond to the client's service manager API calls of "client create object" and "client invoke object" methods. A Server messenger is provided for handling events sent back to a client. Finally, a time out demon manages a thread spawn by the service manager for identifying idle clients (whose connection may be terminated).

DETAILED DESCRIPTION OF A PREFERRED EMBODIMENT

The following description will focus on the presently-preferred embodiment of the present invention, which is operative in a network environment executing client/server database applications. The present invention, however, is not limited to any particular application or environment. Instead, those skilled in the art will find that the present invention may be advantageously applied to any application or environment where optimization of query performance is desirable, including non-SQL database management systems and the like. The description of the exemplary embodiments which follows is, therefore, for the purpose of illustration and not limitation.

Standalone System Hardware

Figure 1A:
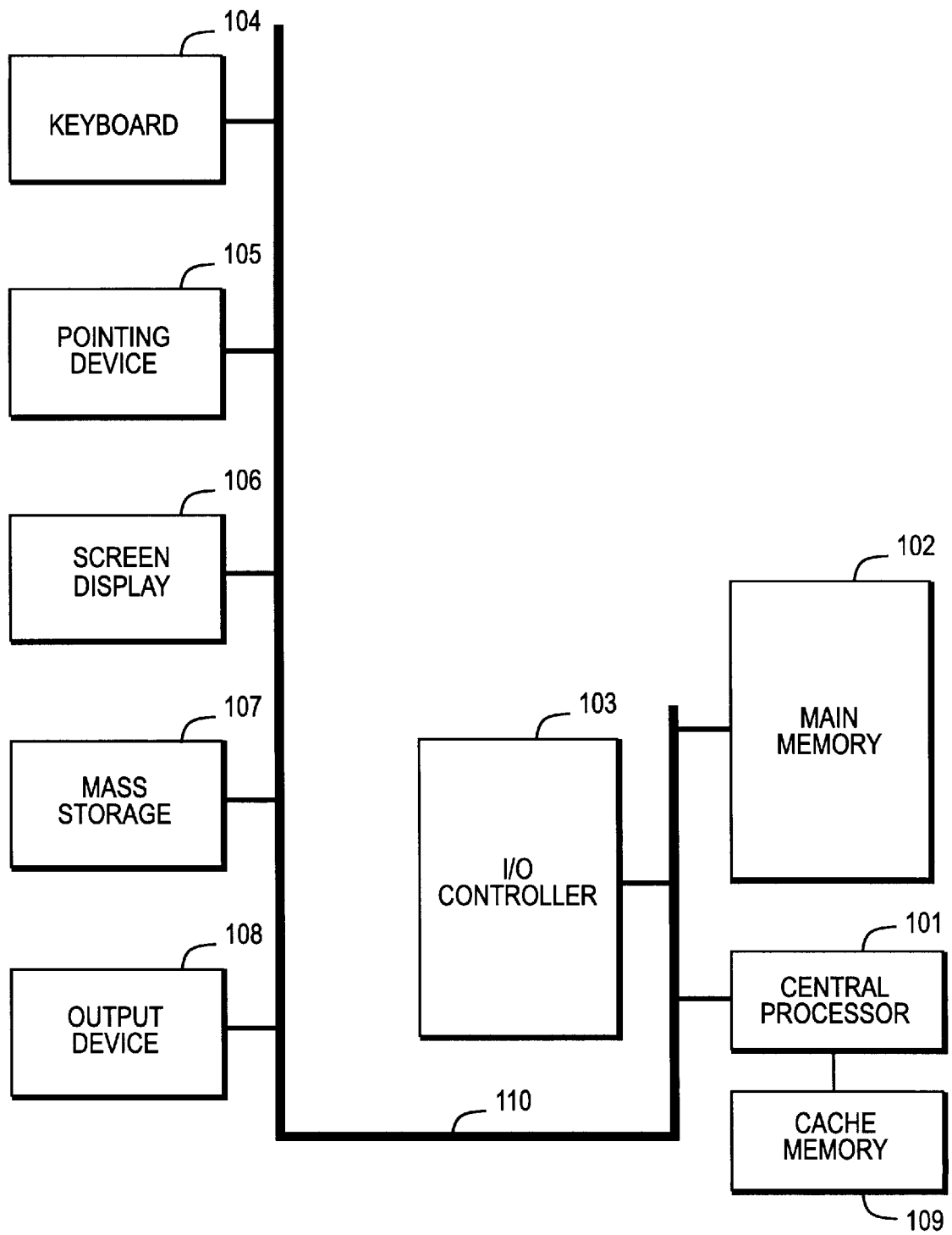
FIG. 1A is a block diagram of a computer system in which the present invention may be embodied.

The invention may be embodied on a computer system such as the system 100 of FIG. 1A, which comprises a central processor 101, a main memory 102, an input/output controller 103, a keyboard 104, a pointing device 105 (e.g., mouse, track ball, pen device, or the like), a screen display device 106, and a mass storage 107 (e.g., hard or fixed disk, removable disk, optical disk, magneto-optical disk, or flash memory). Processor 101 includes or is coupled to a cache memory 109 for storing frequently accessed information; memory 109 may be an on-chip cache or external cache (as shown). Additional output device(s) 108, such as a printing device, may be included in the system 100 as desired. As shown, the various components of the system 100 communicate through a system bus 110 or similar architecture. In a preferred embodiment, the system 100 includes an IBM-compatible personal computer system, available from a variety of vendors (including IBM of Armonk, N.Y.).

Standalone System Software

Figure 1B:
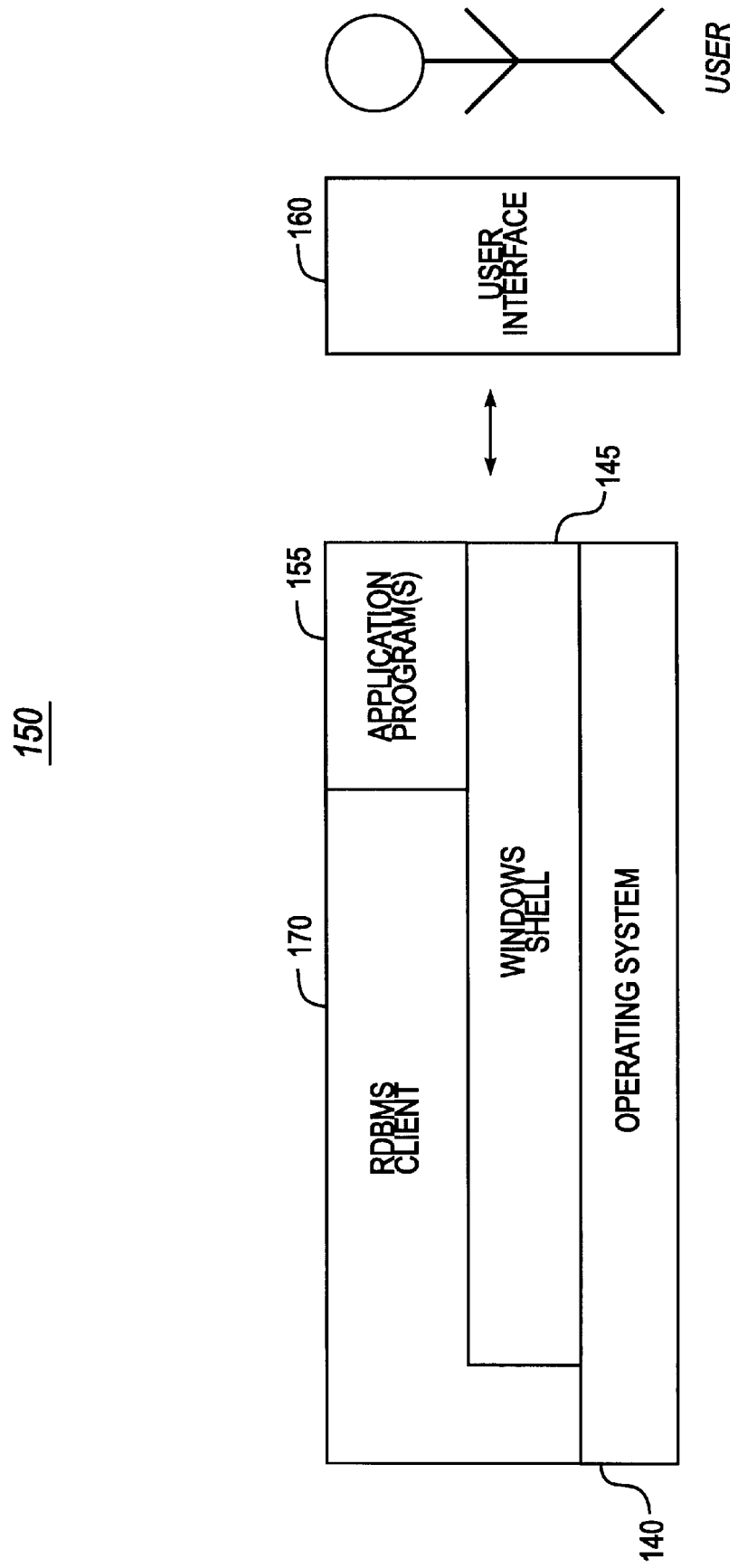
FIG. 1B is a block diagram of a software system for controlling operation of the computer of FIG. 1A.

Illustrated in FIG. 1B, a computer software system 150 is provided for directing the operation of the computer system 100. Software system 150, which is stored in system memory 102 and on mass storage or disk memory 107, includes a kernel or operating system (OS) 140 and a windows shell 145. One or more application programs, such as application software programs 155, may be "loaded" (i.e., transferred from storage 107 into memory 102) for execution by the system 100. The system also includes a user interface 160 for receiving user commands and data as input and displaying result data as output.

Also shown, the software system 150 includes a Relational Database Management System (RDBMS) front-end or "client" 170. The RDBMS client 170 may be any one of a number of database front-ends, including PowerBuilder™, dBASE®, Paradox®, Microsoft® Access, or the like. In an exemplary embodiment, the front-end will include SQL access drivers (e.g., Borland SQL Links, Microsoft ODBC drivers, Intersolv ODBC drivers, and the like) for accessing database tables from an SQL database server operating in a Client/Server environment. In a most-preferred embodiment, the RDBMS client comprises PowerBuilder Enterprise 5.0 for Windows, available from Powersoft of Concord, Mass., a wholly-owned subsidiary of Sybase, Inc. Description of PowerBuilder can be found in the manuals accompanying PowerBuilder Enterprise; additional description can be found in application Ser. No. 08/393,049, filed Feb. 23, 1995, now U.S. Pat. No. 5,566,330. The disclosures of each of the foregoing are hereby incorporated by reference.

Client/Server Database Management System

A. General

Figure 2:
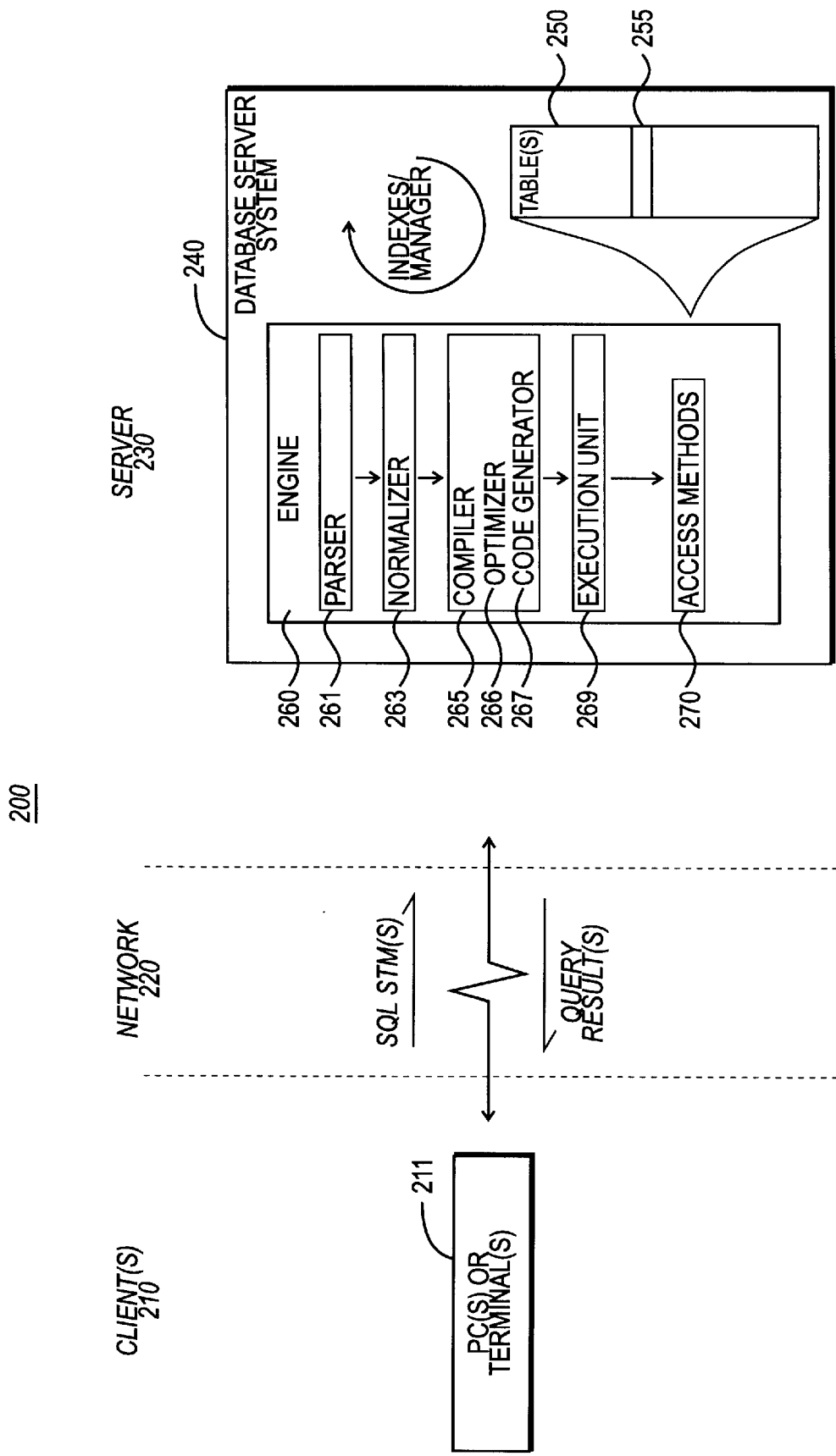
FIG. 2 is a block diagram illustrating a client/server system, the server including a database server system.

While the present invention may operate within a single (standalone) computer (e.g., system 100 of FIG. 1A), the present invention is preferably embodied in a multi-user computer system, such as a Client/Server system. FIG. 2 illustrates the general structure of a Client/Server Database System 200 suitable for implementing the present invention. As shown, the system 200 comprises one or more Client(s) 210 connected to a Server 230 via a Network 220. Specifically, the Client(s) 210 comprise one or more standalone Terminals 211 connected to a Database Server System 240 using a conventional network. In an exemplary embodiment, the Terminals 211 may themselves comprise a plurality of standalone workstations, dumb terminals, or the like, or comprise personal computers (PCs) such as the above-described system 100. Typically, such units would operate under a client operating system, such as Microsoft Windows/MS-DOS for PC clients.

The Database Server System 240, which comprises Sybase SQl Server™ (available from Sybase, Inc. of Emeryville, Calif.) in an exemplary embodiment, generally operates as an independent process (i.e., independently of the Clients), running under a server operating system such as Microsoft Windows NT (Microsoft Corp. of Redmond, Wash.), NetWare (Novell of Provo, Utah), UNIX (Novell), or OS/2 (IBM). The Network 220 may be any one of a number of conventional network systems, including a Local Area Network (LAN) or Wide Area Network (WAN), as is known in the art (e.g., using Ethernet, IBM Token Ring, or the like). The Network includes functionality for packaging client calls in the well-known SQL (Structured Query Language) together with any parameter information into a format (of one or more packets) suitable for transmission across a cable or wire, for delivery to the Database Server System 240.

Client/server environments, database servers, and networks are well documented in the technical, trade, and patent literature. For a discussion of database servers and client/server environments generally, and SQL Server™ particularly, see, e.g., Nath, A., *The Guide to SQL Server*, Second Edition, Addison-Wesley Publishing Company, 1995. Additional documentation of SQL Server™ is available from Sybase, Inc. as *SQL Server Documentation Set* (Catalog No. 49600). For a discussion of a computer network employing Microsoft Networks/OpenNet File Sharing Protocol, see METHOD AND SYSTEM FOR OPPORTUNISTIC LOCKING IN A NETWORKED COMPUTER SYSTEM, Intl. Application No. PCT/US90/04570, Intl. Publication No. WO 91/03024, Intl. Publication Date Mar. 7, 1991.

For a general introduction to a Local Area Network operating under NetWare, see Freed, L. et al., *PC Magazine Guide to Using NetWare*, Ziff-Davis Press, 1991. A more detailed discussion is available in NetWare 3.x and 4.x and accompanying documentation, which is available from Novell of Provo, Utah. The disclosures of each of the foregoing are hereby incorporated by reference.

In operation, the Client(s) 210 store data in or retrieve data from one or more database tables 250, each comprising one or more rows 255, as shown in FIG. 2. Typically resident on the Server 230, each table itself comprises one or more horizontal rows or "records" (tuples) together with vertical columns or "fields." A database record includes information which is most conveniently represented as a single unit. A record for an employee, for example, may include information about the employee's ID Number, Last Name and First Initial, Position, Date Hired, Social Security Number, and Salary. Thus, a typical record includes several categories of information about an individual person, place, or thing. Each of these categories, in turn, represents a database field. In the foregoing employee table, for example, Position is one field, Date Hired is another, and so on. With this format, tables are easy for users to understand and use. Moreover, the flexibility of tables permits a user to define relationships between various items of data, as needed.

In operation, the Client(s) issue one or more SQL commands to the Server. SQL commands may specify, for instance, a query for retrieving particular data (i.e., data records meeting the query condition) from the table 250. The syntax of SQL (Structured Query Language) is well documented; see, e.g., Date, C., *An Introduction to Database Systems*, incorporated herein by reference. In addition to retrieving the data from Database Server tables, the Client(s) also include the ability to insert new rows of data records into the table; Client(s) can also modify and/or delete existing records in the table.

For enhancing the speed in which the Database Server stores, retrieves, and presents particular data records, the Server maintains one or more database indexes on the table, under control of an Index Manager. A database index, typically maintained as a B-Tree data structure, allows the records of a table to be organized in many different ways, depending on a particular user's needs. An index may be constructed as a single disk file storing index key values together with unique record numbers. The former is a data quantity composed of one or more fields from a record; the values are used to arrange (logically) the database file records by some desired order (index expression). The latter are unique pointers or identifiers to the actual storage location of each record in the database file. Both are referred to internally by the system for locating and displaying records in a database file. Alternatively, instead of storing unique record numbers, a "clustered" index may be employed. This is an index which stores the data pages of the records themselves on the terminal or leaf-level nodes of the index.

In operation, the SQL statements received from the one or more Clients 210 (via Network 220) are processed by Engine 260 of the Database Server System 240. The Engine 260 itself comprises a Parser 261, Normalizer 263, Compiler 265 (with Optimier 266), Code Generator 267, Execution Unit 269, and Access Methods 270. Specifically, the SQL statements are passed to the Parser 261 which converts the statements into a query tree—a binary tree data structure which represents the components of the query in a format selected for the convenience of the system. In this regard, the Parser 261 employs conventional parsing methodology (e.g., recursive descent parsing).

B. Integrated development environment

1. General

The system of the present invention provides a development environment, comprising "painters," which is available in the commerical embodiment marketed under the trademark of PowerBuilder™ (available as Part No. MB0725 from Powersoft of Concord, Mass.; the disclosure of the manuals therein are hereby incorporated by reference). Each painter represents a discreet region of functionality in the system which displays a particular graphical interface for performing a particular user task during creation of a database application. In typical use, for instance, a user creates a database application by placing data window components on a form for accessing particular data of interest. The system, in response, will generate the appropriate access commands (e.g., SQL statements) for accessing and manipulating target databases.

Figure 3:
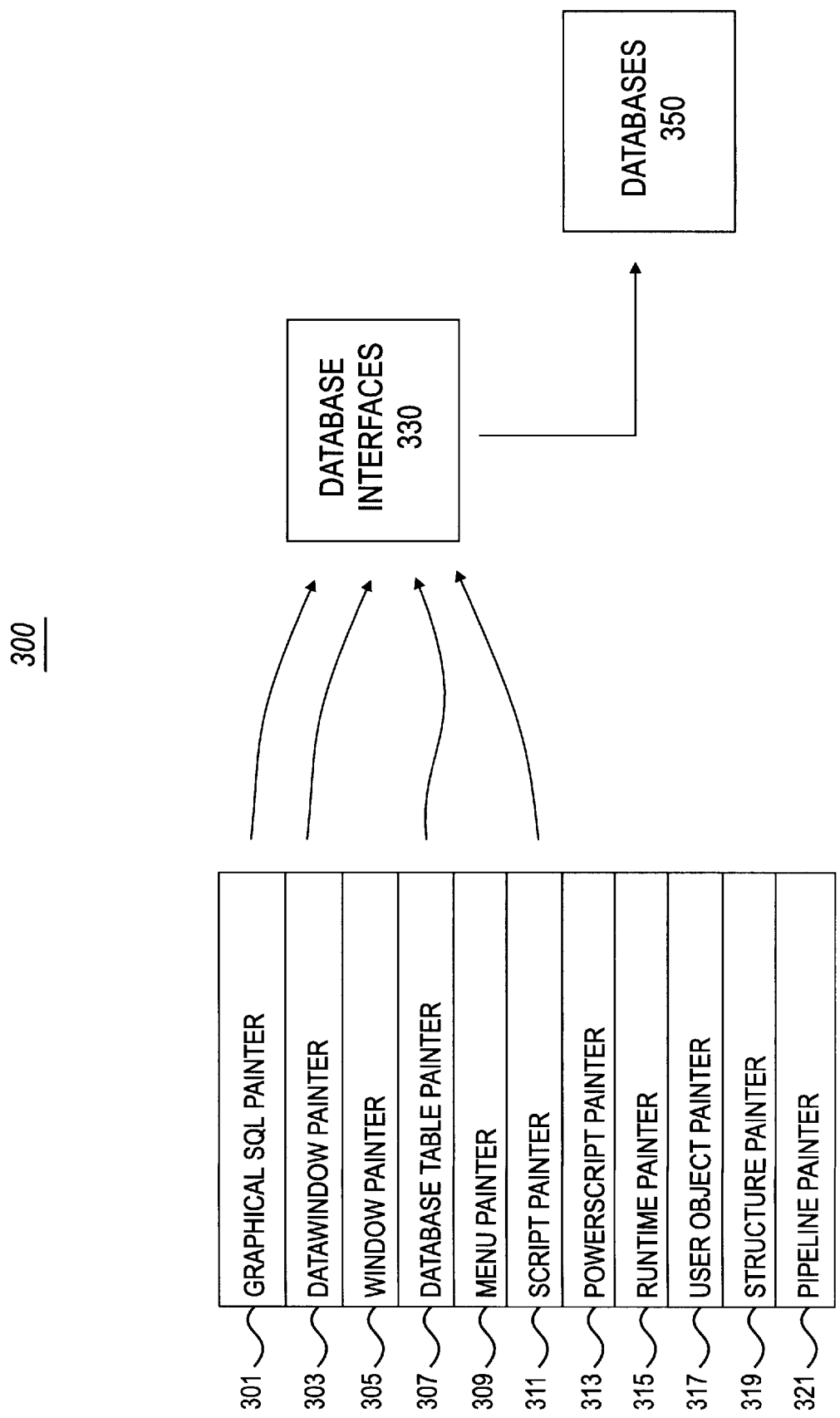
FIG. 3 is a block diagram illustrating basic architecture of a database application development environment of the present invention.

FIG. 3 illustrates the basic architecture of the database application development environment, as embodied in the commercial embodiment of PowerBuilder. As shown in FIG. 3, a development system 300 constructed in accordance with the present invention includes the following modules: graphical SQL painter 301, Data Window painter 303, window painter 305, database table painter 307, menu painter 309, script painter 311, PowerScript compiler 313, runtime engine 315, user object painter 317, structure painter 319, and pipeline painter 321. Graphical SQL painter 301 allows the painter to visually construct data access queries, using graphical user interface technique. Data Window painter 303 (which, in a preferred embodiment, is tightly coupled with the graphical SQL painter 301) allows the user to specify data access, again using graphical user interface technique. Window painter 305 is employed by the user for creating forms, such as a data entry form or window. Database table painter 307 serves largely as a browser, allowing the user to view and modify a target database table. This tool is typically employed for database administration tasks, such as creating different views of a target database table.

Menu painter 309 is used for creating pull down menus, which can be incorporated into the users database application. Script painter 311 serves as a text-based code editor, for allowing the user to attach "snippets" of program code for logic to objects (e.g., visual objects and non-visual objects). PowerScript compiler 313 parses the script which the user has attached to various objects into a compiled program, which is suitable for deployment to an end user. A given compiled application is generally deployed together with runtime engine 315, which supports execution of the programming logic incorporated into the compiled application. During execution, the compiled application communicates with a target database(s) 350 via database drivers or interfaces 330 (e.g., ODBC driver).

User object painter 317 is a catch-all painter for creating generic objects, including hosting non-visual objects. Structure painter 319 supports creation of data structures. Three classes of data are supported: instance data, shared data, and global data. For creating a data structure which is only known to a particular user object, the user would create such a data structure within the user object painter 317. Finally, pipeline painter 321 allows the user to specify "piping" of data from one data source to another; its operation is described in further detail in commonly owned patent application Ser. No. 60/008,595, filed Dec. 13, 1995, entitled Database Development System With Methods For Piping Data Between Data Sources, the disclosure of which is hereby incorporated by reference.

2. Non-visual objects (NVOs)

In the system of the present invention, a user can create a non-visual object (NVO) for implementing business logic which is independent from user interface objects (e.g., a screen button). When a user places a screen or push button on a form which serves to post a record to a database table, the user would not associate or attach code to the button (visual object) for enforcing referential integrity. Since enforcement of referential integrity exists independent of the screen button, the user would instead create a non-visual object which implements this particular business logic. The business logic for the application, therefore, can be represented as a non-visual object which implements various business methods. As user interface objects are often and closely coupled with client operating systems (e.g., Microsoft Windows or Apple Macintosh), separation of business rules from visual objects leads to increased program modularity, thus simplifying design and maintenance of the application.

3. Dispatcher loop

Figure 4:
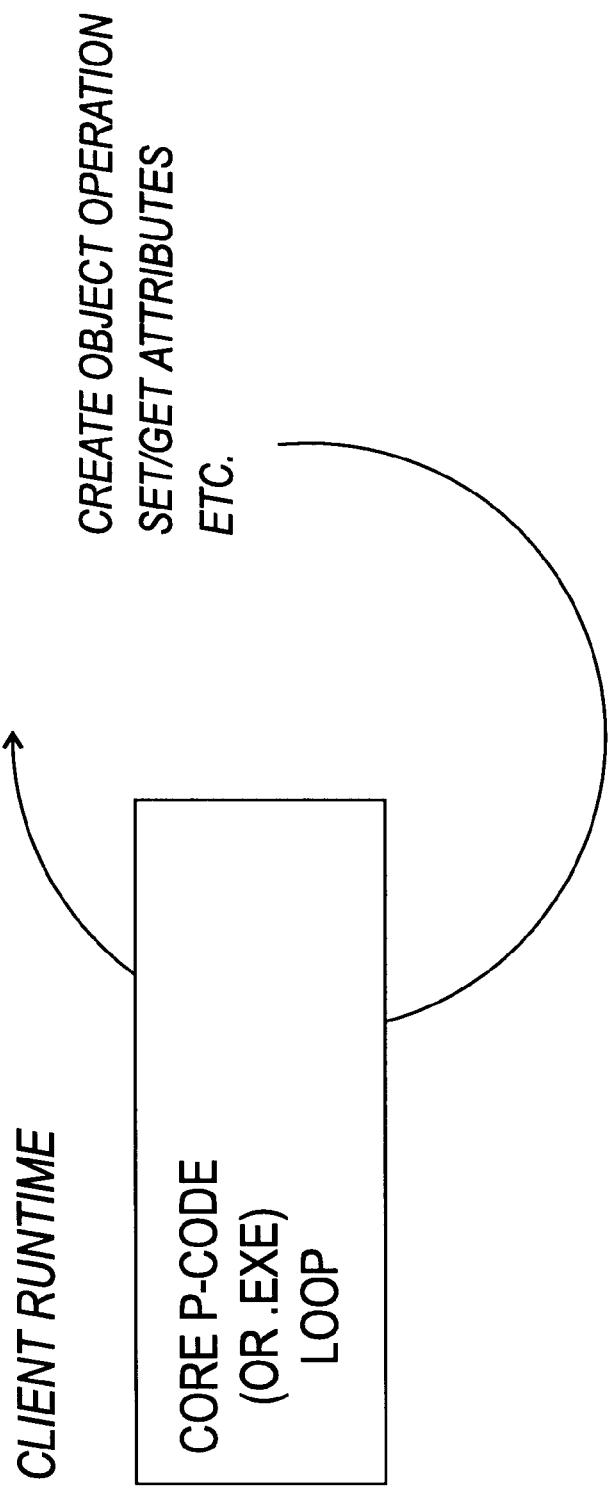
FIG. 4 illustrates a dispatcher loop which drives the operation of a client application which executes in the system (of FIG. 2).

Internally, a dispatcher loop 400, as FIG. 4 illustrates, drives the operation of a client application at runtime. The loop implements a message-based architecture, one which receives messages occurring in response to system events and, in turn, dispatches those messages to various runtime event handlers. Services of the runtime engine 315 may be viewed as connected to or "hanging off" the dispatcher loop. Based on the various tokens encountered from the compiled application (p-code), various services of the runtime engine are invoked. As shown in the figure, for instance, typical services include create object, set/get attributes, and the like. Alternatively, the database application can be compiled to native machine code (e.g., Intel 80X86 machine code), whereupon the dispatcher loop comprises, in essence, a machine code "while" loop, one which is structured to execute the code in a correct order. In either case, occurrence of an event triggers a corresponding event handler which executes to its completion (and thereafter returns control back to the loop).

Modification of the system for providing n-tier distributed computing

A. Modification to script syntax for supporting distributed computing

In a non-distributed (regular) PowerScript environment, a "create non-visual user object" statement and an "invoke user object" method are identical to the distributed or non-distributed PowerScript usage of a user object. The scripts themselves can be a part of any of the scriptable objects in one's application (starting from the application object itself to any of the window objects). According to the present invention, the PowerScript syntax is extended to now support remote sessions with any non-visual object (which itself may be contained within a visual object, such as a window). When a user desires to create a "remoteable" object from a user object, the user invokes an option from the painter (used to create the object) for assigning a proxy name or alias. This provides a mechanism to differentiate the real (local) version of the object from a remote version of that object. When the user creates the proxy, the system generates all of the interface definitions for the object (i.e., to access its internal functionality) which are capable of being proxied (i.e., "proxiable"). A given object can reside locally, remotely, or both; the proxy mechanism allows the user's application to resolve at runtime which version of the object to invoke. When the user is building the "real" or server object, the system also builds the proxy object (in addition to the real object). When the application is deployed, the proxy object is deployed at the client machine for use at the client for accessing the real version at the server. If desired, an application can be deployed with a real copy of the object, in addition to the proxy. In such a case, the client can serve as a server (of that object), in addition to being a client of objects from other servers.

B. Application execution

Figure 5:
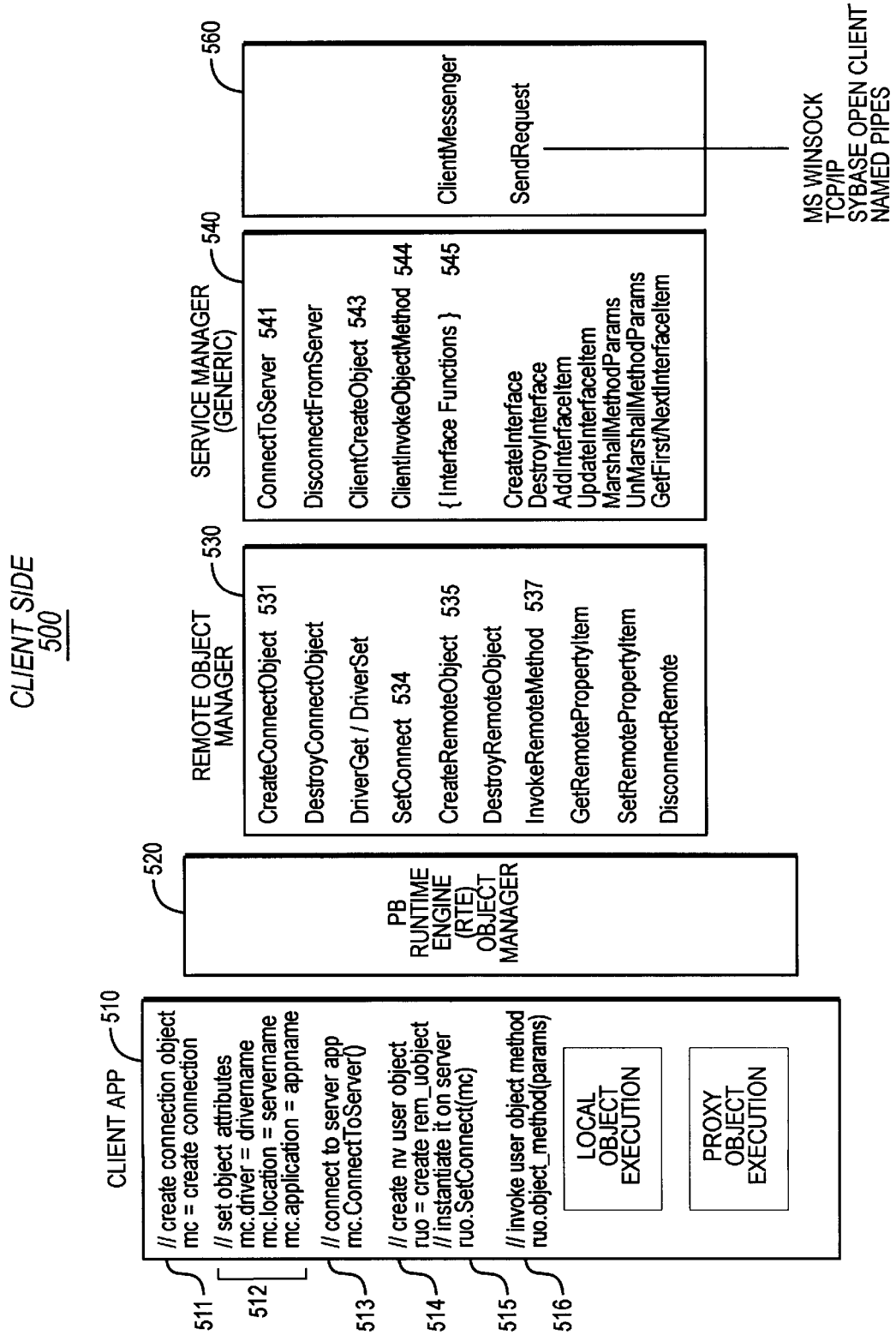
FIG. 5 is a block diagram illustrating execution of an application on the client side of the client/server system.

FIG. 5 illustrates execution of an application from the client's perspective (500). The deployed application, client application 510, resides on the client machine. Execution begins with the client creating a "connection object," create connection 511. This object represents a connection to a server. In response to this command, PowerBuilder Runtime Engine (RTE) 520 instantiates a create connection object and, additionally, invokes CreateConnectObject handler 531, at remote object manager 530. This action leads to invocation of the service manager 540, specifically invoking its ConnectToServer handler 541 which establishes the necessary server connection, using Communications and Service driver 560. As shown at 512, various attributes or properties of the connection object are set at the client, followed by the actual call to ConnectToServer (at 513). The attributes themselves specify a particular driver (e.g., Winsock), as well as server location and application name. The ConnectToServer call 513 on the connection object leads to invocation of the remote object manager's SetConnect handler 534.

Now, the non-visual object is created at the client as follows. Create remote user object statement 514 is executed at the client; this creates the proxy object in the client's local space. At this point, the proxy object is not usable; first, it must be associated with a server. This is done by the SetConnect call 515. In particular, the call associates the proxy object (previously instantiated) with the server. This leads to, in turn, invocation of CreateRemoteObject handler 535. As a result, the system attempts to instantiate the corresponding object at the server side. When the real object is instantiated at the server, it is created with the same properties and methods for which corresponding stubs were created at the proxy.

Actual invocation of the remote object's method is shown at 516. This leads to invocation of InvokeRemoteMethod handler 537. In essence, the proxy object (corresponding stub) passes the invocation request to the InvokeRemoteMethod handler 537, including passing it all relevant parameters.

When the call is passed over to the service manager 540, the call is processed in a generic fashion. Here, the information is translated into a representation for each of the possible types of remote invocation calls, thereby packaging the call for the communication layer 560 to transport.

The remote object manager 530 serves to translate information to and from the client application 510 and the service manager 540. This bidirectional translation module will, when appropriate, invoke error handlers at the client application. The remote object manager includes handlers which correspond to commands in the PowerScript language. The service manager, on the other hand, provides an interface of internal functions, invoked by the remote object manager 530, for taking information in PowerBuilder's internal object form and creating a generic interface that represents the same information (e.g., accessible from a buffer).

The service manager interface functions 545 provide an API (Application Programming Interface) for supporting invocation of remote methods. CreateInterface and DestroyInterface manage creation and destruction of an interface for a method call, respectively. Internally, remote method calls are supported by a linked list of items. Management of the list is provided by AddInterfaceitem and UpdateInterfaceItem. Parameter data is processed by MarshallMethodParams and UnmarshallMethodParams. Traversal of the list is provided by GetFirst/NextInterfaceItem. Collectively, the API functions to pass method invocations, with appropriate parameter information, to the communication layer 560. Hierarchical information from the item list is "flattened" into a linear byte stream.

Communication on the client side is straightforward. The appropriate driver, such as Transmission Control Protocol/Internet Protocol (TCP/IP, including Microsoft's Winsock implementation), Sybase Open Client, Named Pipes, or the like, is initialized. The selected driver, in turn, undertakes send/receive actions. The server, in turn, "listens" for messages from the client. On the server, there exists a corresponding object for the connection object—the transport object. The transport object is, in an analagous manner, created using a PowerScript create statement. Once created, properties for the transport object are set according to the connection profile, including application name and type of communication supported. The server is created in a manner analagous to that of the client application. Specifically, the PowerScript includes code for creating and instantiating a transport object. This object, in turn, functions as the "listener" for the client. Each request for a connection from a client initiates a session for that client in its own thread space at the server.

C. Server operation

Figure 6:
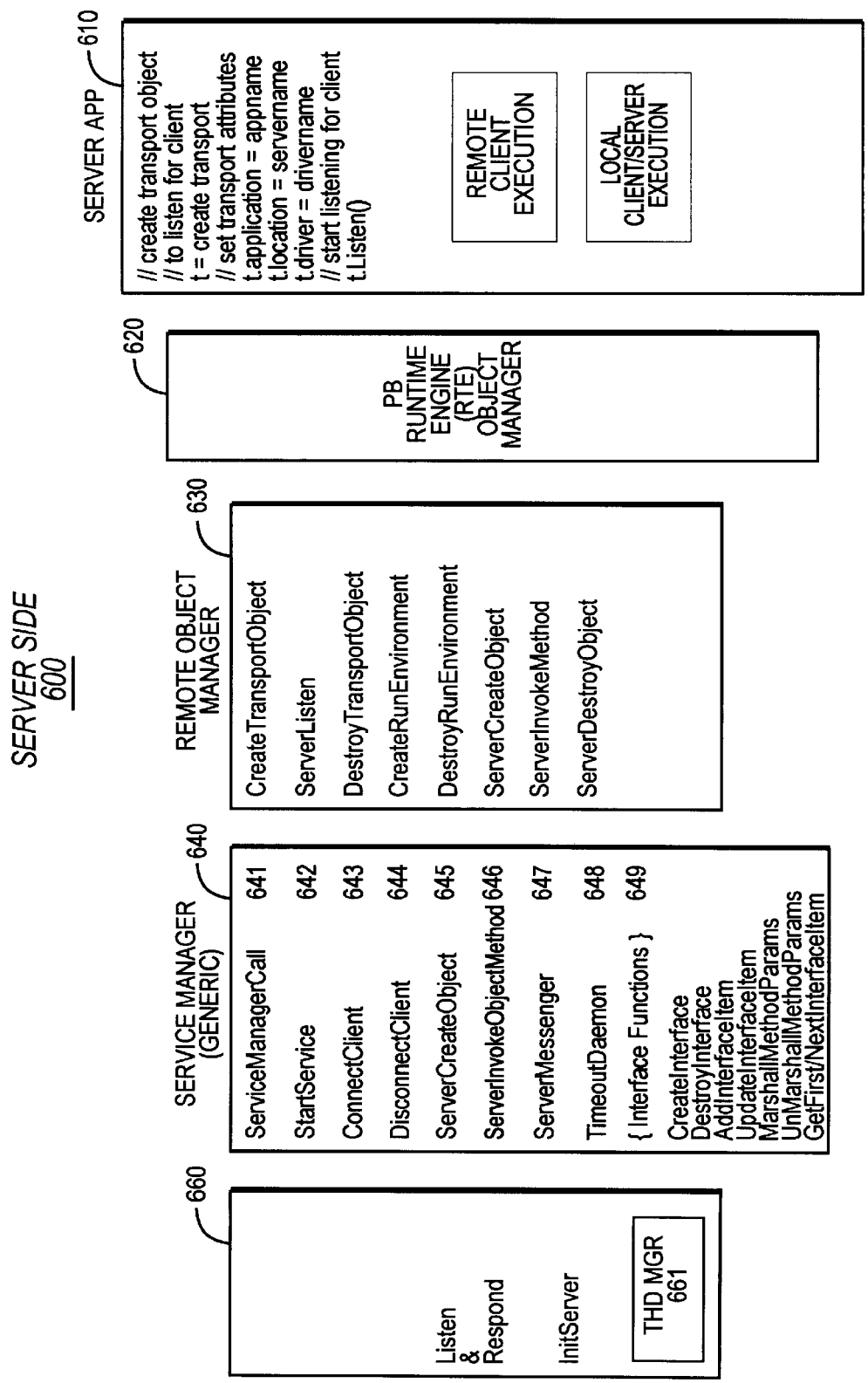
FIG. 6 is a block diagram illustrating application execution at the server side of the client/server system.

FIG. 6 illustrates system functionality, from the perspective of the server. As shown, the server includes modules which complement those of the client, with module 660 corresponding to module 560, module 640 corresponding to module 540, module 630 corresponding to module 530, module 620 corresponding to module 520, and module 610 corresponding to module 510. Interface Functions 649 represents a corresponding set of interface functions on the server side. These serve to build a representation of the information suitable for processing at the server. For listening and responding to clients, the server includes a Communications and Service driver 660 having a thread manager 661. Multi-tasking is handled by the server-side Communications and Service driver 660. As a result, multi-tasking is handled by the server-side Communications and Service driver 660, so that the management of multiple client threads and the pool of available threads occurs at the level of the driver 660.

Similarly, corresponding to the client's service manager 540 is the server's service manager 640. The entry point into the service manager 640 is ServiceManager call 641. This provides the communication drivers with a single point of entry at the server. StartService call 642 responds to a server listen event. ConnectClient 643 services the client's request to "ConnectToServer" (513). In a corresponding manner, DisconnectClient 644 drops the connection. ServerCreateObject 645 and ServerInvokeObjectMethod 646 correspond to the client's service manager 540 API calls of "client create object" 543 and 15 "client invoke object" method 544. Server messenger 647 is provided for handling events sent back to a client. Time out demon 648 represents a thread spawn by the service manager 640 for identifying idle clients (whose connection may be terminated).

Internal operation

A. Data structures

At the outset, it is helpful to first review core data structures employed by the system. Connection-wide information or context data is maintained in a service manager interface (SMI) command structure. In an exemplary embodiment, this data structure may be constructed as follows (shown in the C programming language).

```
/* Service Manager Interface */
/* Carries Connection-wide data */
typedef struct SMI_Command
{
CHAR            szPBAppname[MAXNAME - 1];
LONG            lPBAppMajorVer;
LONG            lPBAppMinorVer;
CHAR            szPBComputer[MAX_COMPUTER_NAME_SIZE];
BYTE            bAcceptConnections: 1,
                bDevtMode: 1,
                bPCodeExe: 1,
                bFlags: 5;
CLIENTID              Client;
UINT                  iMaxBuf;
INT                   iMaxAgents;
LONG                  lReturnCode;
LONG                  lLastError;
LONG                  TimeOutThreshold;
HANDLE                hServerConnection;
HANDLE                hClientThread;
HANDLE                hServerContext;
HANDLE                hClientContext;
HANDLE                hIntLock;
HINSTANCE             hmDSE;
HINSTANCE             hmDriver;
PB_CRITICAL_SECTION   csIntLock;
CHAR                  szConnectName[MAXPATH - 1];
ppbstg_anchor         PBstg;
LPVOID                pTransport;
LONG                  PBstgSubPool;
PSHHASH               pshClient;
LPSTR                 lpszUserId;
LPSTR                 lpszPass;
LPSTR                 lpszConnectString;
PCS_MSG               pCmd;
LPSTR                 lpszPBLibraryList;
PSERVER_STATS         pSrvStat;
pDPBTrace             pTRACE;
LPVOID                pUserData;
LPSTR                 lpszDriverParm;
LPVOID                lpLocalConnect;
PRT_ERROR_STRUCT      pRuntimeError;
DWORD                 dwStartupTickCount;
HANDLE                hTimerThread;
LPSTR                 lpszOptions;
PSHLIST               pOptionList;
SMIFARPROC            fpCommDriverCall;
} SMI_COMMAND, FAR * PSMI_COMMAND;
```

The variable name szPBAppname stores the name of the AppServer or application server. The variable name lPBAppMajorVer stores the AppServer's major version. The variable name lPBAppMinorVer stores the AppServer's minor version. The variable name szPBComputer stores the computer's "sharename." This indicates the location of the computer on the network. The variable name bAcceptConnections will return "TRUE" if transport is accepting connections; bDevtMode will return "TRUE" if in development mode; and bPCodeExe will return "TRUE" if running a P-Code executable; and bFlags stores unused or FLAG bits.

The variable Client stores Client-side only information which serves as a Key of the Client connection. The variable iMaxBuf stores the maximum buffer size to allocate. The maximum buffer size is employed for communication buffers, on the server side. The variable iMaxAgents stores the maximum number of active (server) threads for service. The variable 1ReturnCode stores a return code for connect errors. The variable 1LastError stores a connect error Return code from GetLastError. The variable TimeOutThreshold indicates a timer threshold for connection. This data member is employed for detecting inactive clients (i.e., clients which have been inactive beyond the TimeOutThreshold). The variable hServerConnection stores a Handle to a dedicated server thread. The variable hClientThread stores thread ID (TID) of a Data Window worker thread. The variable hServerContext stores an Event Handle to server RPC lock. The variable hClientContext stores an Event Handle to client RPC lock. The variable hIntLock stores a Mutex Handle to lock interface across processes. The variable hmDSE stores a Module Handle to Remote Object Manager. The variable hmDriver stores a Module Handle to connection driver. The variable csIntLock stores a Critical Section object pointer—employed to synch threads. The variable szConnectName stores the Connection name. The variable PBstg stores an anchor to a PB stg, an internal PowerBuilder structure. The variable pTransport stores a pointer to a transport object. The variable PBstgSubPool stores a PB stg sub-pool (memory block). The variable pshClient stores a pointer to a client context table. The variable lpszUserId stores a Login user ID. The variable lpszPass stores a Login user password. The variable lpszConnectString stores Login user connectstring. The variable pCmd stores Client/Server Message structure. The variable lpszPBLibraryList stores .PBL Library list pointer. The variable pSrvStat stores Server statistics (e.g., how many reads and writes). The variable pTRACE stores a handle to trace structure. The variable pUserData stores a pointer or handle to user private data. The variable lpszDriverParm stores Driver Specific Parameters. The variable lpLocalConnect stores a pointer to connect object for a local loopback driver. The variable pRuntimeError stores a client-side pointer to an error (err) struct returned on call. The variable dwStartupTickCount stores a TickCount to protect against counter roll-over. The variable hTimerThread stores a Handle of a timeout daemon. The variable lpszOptions stores a pointer to driver/transport options. The variable pOptionList stores a pointer to options parsed into a list. The variablefpCommDriverCall stores a function pointer to "DPBSendRequest" entry point of communication driver.

B. Methodology

At the outset of a distributed PowerBuilder session, a connection object (ConnectObject) is created (as previously described). In an exemplary embodiment, the object is created from a PowerBuilder connection class, which may be constructed as follows.

```
system type Connection from ConnectObject
// . . . contstructor/destructor code
public:
function long ConnectToServer () &
system library "pbdse050.dll" &
alias for "PBOBJIConnectToRemote"
function long DisconnectServer () &
system library "pbdse050.dll" &
alias for "PBOBJIDisconnectRemote"
indirect string UserID {UserIDSet(*value),UserIDGet()}
indirect string ConnectString
{ConnectStringSet(*value),ConnectStringGet()}
indirect string Password {PasswordSet(*value),PasswordGet()}
function long GetServerInfo (ref ConnectionInfo info[]) &
system library "pbdse050.dll" &
alias for "PBOBJIGetRemoteInfo"
function long RemoteStopListening() &
system library "pbdse050.dll" &
alias for "PBOBJIRemoteServerStopListen"
function long RemoteStopConnection(string ClientID) &
system library "pbdse050.dll" &
alias for "PBOBJIRemoteServerStopUserConnection"
event Error(uint ErrorNumber, &
readonly string ErrorText, &
readonly string ErrorObject, &
readonly string ErrorScript, &
uint ErrorLine, &
ref ExceptionAction Action, &
ref any ReturnValue)
end type
```

The connection object returns an array of "ConnectionInfo," from its GetServerInfo method. Each ConnectionInfo object, in turn, is an instance of the following PowerBuilder system class, ConnectionInfo.

```
system type ConnectionInfo from Structure
string      Location
string      UserID
string      ClientID
datetime    ConnectTime
datetime    LastCallTime
long        CallCount
boolean.    Busy
end type
```

As shown, a ConnectionInfo object stores information characterizing a particular server connection.

The connection object itself includes functionality for supporting a server connection, such as ConnectToServer and DisconnectServer methods. Additionally, the object stores strings supporting each connection, including a UserID, a ConnectString (context), and a Password. The ConnectionObject also includes methods or functions supporting remote communication, including RemoteStopListening and RemoteStopConnection methods.

A proxy object on the client is created as an object instance from a PowerBuilder system class, RemoteObject, which may be constructed as follows.

```
// remoteobject represents the proxy object on client
system type RemoteObject from NonVisualObject
protected:
private ObjHandle handle
// ctor
subroutine create_object (readonly String s) &
system library "pbdse050.dll" &
alias for "PBOBJICreateRemoteObject"
//dtor
subroutine destroy_object () &
system library "pbdse050.dll" &
alias for "PBOBJIDestroyRemoteObject"
public:
function any invoke_method (readonly string s, uint ns, &
ref any args[]) &
system library "pbdse050.dll" &
alias for "PBOBJIInvokeRemoteMethod"
subroutine SetConnect(Connection c) &
system library "pbdse050.dll" &
alias for "PBOBJISetConnectObject"
end type
```

The proxy (remote) object which inherits from NonVisualObject (NVO), forwards any requests to the previouslymentioned InvokeRemoteMethod API routine. The proxy object also includes a SetConnect method call, (corresponding to the SetConnect handler 534).

The CreateConnectObject method is invoked (by the object manager) when a ConnectObject is created. In an exemplary embodiment, the method or function may be constructed as follows.

```
//
// this function is called by the Object manager when a CONNECT
// object is created.
//
extern "C" PBWINAPI (INT, PBOBJICreateConnectObject)
(
PRT_THIS rtThis,
UINT uiArgCount
)
{
LPSTR lpszClassName=0;
BOOL bNull = FALSE;
OB_INST_ID obInst;
PVOID pDispatcher = NULL;
PBOBJIConnect *pConnect=0;
POB_DATA pDispObject=0, pobStringArg=0;
// if we are building an executeable,
// then don't actual do anything.
RETURN_IF_BUILDING_EXECUTEABLE(rtThis)
// Get the object instance for which the call was made
ot_get_curr_obinst_expr(rtThis, &obInst, &bNull);
if (bNull)
return FAILURE; // this error should never occur
pobStringArg = ot_get_next_evaled_arg (rtThis);
lpszClassName = ot_get_data_str (rtThis, pobStringArg);
if (bNull)
return FAILURE; // this error should never occur
// allocate our own internal connection object which we will hang
// off of the powerbuilder connection object.
pConnect = new(rtThis->stgthis,0) PBOBJIConnect(rtThis);
pDispatcher = (PVOID)pConnect;
pDispObject = ob_get_field_data(rtThis, obInst,
FLD_REMOTEOB_HANDLE);//XXXXXHandle);
if (!pDispObject)
{
delete pConnect;
return FAILURE; // this error should never occur
}
ob_set_data_ptr(pDispObject, pDispatcher, HANDLE_TYPE, 0);
return SUCCESS;
}
```

As shown, the method is invoked with a "this" (i.e., runtime "this" or self pointer) together with a count of parameters or arguments. The actual arguments passed are not passed on the stack but, instead, passed off a runtime list. The method operates by retrieving the object instance for which the call was made. If the object instance is never instantiated, the method will return "failure." Instance data is extracted, including an argument string and class name. Now, storage can be allocated for the ConnectObject which is hung off the object instance (PowerBuilder ConnectObject). In the event that no errors occur, the method returns "success."

A connection is created from the class PBOBJIConnect, which may be constructed as follows.

```
// define class representing Connection object
class PBOBJIConnect : public PBOBJICommon
{
PSHLIST pObList; // list of objects created off of this
connection
private:
UINT bConnected : 1, // true if we are connected
bCallInProgress : 1, // true if a call is in progress
bDisconnectAfterCall : 1, // true if we should disconnect after
call
bDestroyConnectAfterCall : 1; // true if we should disconnect/destroy
the connection after call
CLIENTID idClientConnect;
RT_ERROR_STRUCT rtErrorInfo; // runtime error information
OB_INST_ID obid_connectobject; // The powerbuilder object id for
this instance of
// the connect object.
VOID ClearError() // clear the current error information
{
SetErrorCode(0);
SetErrorString("");
}
public:
PBOBJIConnect(PRT_THIS rt) : PBOBJICommon(rt)
{
bConnected = 0;
bCallInProgress = 0;
bDisconnectAfterCall = 0;
bDestroyConnectAfterCall = 0;
pbstg_memset(&rtErrorInfo,0,sizeof(rtErrorInfo));
sm_cmd.pRuntimeError = &rtErrorInfo;
BOOL bNullFlag;
ot_get_curr_obinst_expr(rtThis,&obid_connectobject,&bNullFlag);
pObList = 0;
}
// PRE: IsInCall() == TRUE
void DestroyLater ()
{
bDestroyConnectAfterCall = 1; // set flag to destroy after
method invoke
PB_ASSERT(IsInCall());
}
// PRE: IsInCall() == TRUE
void DisconnectLater()
{
bDisconnectAfterCall = 1; // set flag to Disconnect after
method invoke
PB_ASSERT(IsInCall());
}
BOOL QDisconnectNow()
{
return bDisconnectAfterCall;
}
BOOL QDestroyNow()
{
return bDestroyConnectAfterCall;
}
BOOL IsInCall()
{
return bCallInProgress;
}
void SetInCallStatus(BOOL bInCall)
{
bCallInProgress = bInCall;
}
// connect to the server machine
BOOL LinkUpToServer(ppbstg_anchor stgthis);
// disconnect from the server
BOOL DisconnectServer(LPSTR lpszClientId=0);
BOOL IsConnected()
{
return bConnected;
}
// virtual function from PBOBJICommon that returns true if this object
has been activated
// (ie; is connected or is listening for communications)
BOOL IsActive()
{
return IsConnected();
}
PRT_THIS GetRtThis(void) const{return rtThis;}
PRT_ERROR_STRUCT GetrtErrorInfo() {return &rtErrorInfo;}
//runtime error information
// handle error processing, returns TRUE if an error occured
// bRetryOperation will be set to TRUE if the operation should be
retried
BOOL ErrorProcessing
(BOOL &bRetryOperation, BOOL &bValueWasReturned,BOOL
```

```
bTriggerApplicationEvent,BOOL& bSendANullBack);
// get remote client information
BOOL GetRemoteInfo
(POB_DATA pClientInfoArray,LONG FAR * pItemCount);
// tell the remote server to stop listening
BOOL RemoteServerStopListen();
// returns the Powerbuilder object instance for connection object
POB_INST_ID GetPBObjectID()
{
return &obid_connectobject;
}
// register a remote object as belonging to this server connection
void RegisterProxy(PBOBJIRemoteOB* pobProxy);
// unregister a remote object from this server connection
void UnRegisterProxy(PBOBJIRemoteOB* pobProxy);
// disconnect all remote objects from this server connection
void DisconnectObjects ();
};
```

As shown, the class includes a data member, pObList, representing a list of objects created off of this (object) connection. This represents a pointer list of all the objects which had been remotely instantiated.

Also shown, the class includes a constructor which serves to reset flags and fill in the ConnectionObject instance handle. The class also defines several functions which return context information. For instance, QDisconnectNow queries the object for determining whether the connection can be disconnected. QDestroyNow queries the object for determining whether it can be destroyed. IsInCall returns information for indicating whether the object is currently processing a call.

RegisterProxy serves to register a remote object as belonging to a particular server connection. This is how an object ends up in the private collection list of objects (that are instantiated). In a corresponding manner, UnRegisterProxy reverses the process—unregistering a remote object from the particular server connection. DisconnectObjects disconnects all remote objects from the server connection.

The remote or proxy object, which exists at the client, is created from a RemoteObject class, RemoteOB, which may be constructed as follows.

```
// Define class representing the RemoteObject Powerbuilder class.
// This class will exist in the client environment and is used as
// the handle to the remote object on the server.
class PBOBJIRemoteOB
{
PBOBJIConnect* pConnect; // connection to the server
PBOBJI_OBJECTID32 obidRemote; // handle to the Remote object
instance
LPSTR lpszRemoteClass; // remote object class name
PRT_THIS rtThis; // points to local rtThis that this object is
an instance of
public:
PBOBJIRemoteOB(
PBOBJIConnect* pUseConnect,
LPSTR lpszRemoteClassName,
PRT_THIS rtThis);
~PBOBJIRemoteOB();
LONG InvokeRemoteMethod(
LPSTR lpszName,
UINT iParameters,
POB_DATA pArgArray);
void SetConnect (PBOBJIConnect* pUseConnect);
void ClearConnect()
{
pConnect = 0;
obidRemote = 0;
}
// return true if the object has been created on the server
BOOL IsActive()
{
return (0 != pConnect);
}
};
```

Of particular interest is the data member obidRemote. This represents a handle to the remote object instance. Additionally, the class includes a data member for storing a back pointer to a Connection Object.

The system type RemoteObject, which inherits from Non VisualObject, may be constructed as follows.

```
// remoteobject represents the proxy object on client
system type RemoteObject from NonVisualObject
protected:
private ObjHandle handle
// ctor
subroutine create_object (readonly String s) &
system library "pbdse050.dll" &
alias for "PBOBJICreateRemoteObject"
//dtor
subroutine destroy_object () &
system library "pbdse050.dll" &
alias for "PBOBJIDestroyRemoteObject"
public:
function any invoke_method (readonly string s, uint ns, &
ref any args[]) &
system library "pbdse050.dll" &
alias for "PBOBJIInvokeRemoteMethod"
subroutine SetConnect(Connection c) &
system library "pbdse050.dll" &
alias for "PBOBJISetConnectObject"
end type
```

The proxy objects created on the client side inherit from RemoteObject. As shown, the RemoteObject class includes a constructor and destructor. The constructor creates an instance of a RemoteObject.

Invocation of the constructor leads to, in turn, invocation of a CreateRemoteObject method, which may be constructed as follows.

```
//
// this function is called by the Object manager when a RemoteObject
// object is created.
//
extern "C" PBWINAPI (INT, PBOBJICreateRemoteObject)
(
PRT_THIS rtThis,
UINT uiArgCount
)
{
.
.
.
PBOBJIRemoteOB *pOb=0;
// allocate our own internal remote object which we will hang
// off of the powerbuilder object instance.
pOb = new (rtThis->stgthis,0) PBOBJIRemoteOB(0,lpszClassName,
rtThis);
.
.
}
```

This leads to allocation of a remote object, PBOBJIRemoteOB. This is employed as a handle to the instance of the RemoteObject on the server. When SetConnect is called at the client, the corresponding SetConnect is invoked at the server. At that point, the RemoteObject is created. At that point, the client can use the handle to RemoteObject for invoking remote methods.

The actual method for invocation of remote methods, InvokeRemoteMethod, may be constructed as follows.

```
LONG PBOBJIRemoteOB::InvokeRemoteMethod
(
LPSTR    1pszName,        // remote method name
UINT     iParameters,     // number of parameters in 'pArgArray'
POB_DATA pArgArray        // array of parameters
)
    {
    BOOL       bRetryoperation;      // the invoke method is retried
if true
    BOOL       bValueWasReturned;    // TRUE if the user's
error script caused a value to be returned already
    BOOL       bSendANullBack = FALSE;
    LONG       rc = SUCCESS;
    BOOL       bAnErrorOccured = FALSE;
    PSHLIST    pSmiParameters;
    PSMIDATA   psmidataReturnType;
    OB_DATA    obReturnObjectInstance; // if the return value is a
structure
               // then the instance will be in here
    PBOBJIDeferMemoryRelease MemCollection(rtThis->stgthis);
    do         // repeat invoke method whie bRetryOperation is TRUE
        {
        pSmiParameters = 0;
        psmidataReturnType = 0;
        bRetryOperation = FALSE;
        bValueWasReturned = FALSE;
        bAnErrorOccured = FALSE;
        bSendANullBack = FALSE;
        if(pConnect->IsInCall())  // only one called allowed at a time
        {
        pconnect->SMIBlockPtrGet()->1Returncode = DSE_CALL_IN_
PROGRESS;
        bAnErrorOccured = TRUE;
        }
        if(!bAnErrorOccured)
        {
        BOOL       bHaveArrayVarInfoFlags = FALSE;
            // true if we have array info flags accumulated
            // for carrying out a method call.
        USHORT     FAR*          pusVarInfoFlags = 0;    // points to
the array of var info flags.
        INT    iNumVarInfoFlags = 0;          // how many var info flags
are in the array.
        pConnect->SetInCallStatus(TRUE);    // set the in method call
flag
        pConnect->SMIBlockPtrGet()->1ReturnCode = 0
        // default to passing the first parameter in 'pArgArray' to the
method,
        // but for built in functions we can extract starting parameters
        // out for our own usuage.
        UINT      iStartingPBArguementNumber = 0;
        // should we trace
        USHORT    bTraceDSECalls =
DPBTraceQueryOption (pConnect->TraceInfoGet(), bDSECalls);
        // allocate array of SMI parameter buffers
        psmidataReturnType =
(PSMIDATA)pbstg_alloc(rtThis->stgthis,sizeof(SMIDATA) *
(iParameters + 1),0);
        pbstg_memset(psmidataReturnType, 0, sizeof
(*psmidataReturnType) * (iParameters +1));
        MemCollection.Add(psmidataReturnType);
        psmidataReturnType[0].iDataType = SMI_VOID;
        OBJIParmSignatureDecode pMethodDescription(rtThis,1pszName);
        // setup the first parameter as representing the return type
        pSmiParameters =
    PBOBJISetupReturnDefinition(
        rtThis,
        &pMethodDescription,
        &psmidataReturnType[0],
        pConnect->SMIBlockPtrGet(),
        &obReturnObjectInstance,
        MemCollection);
    OBJIPOBDATAReferenceInfo
    RefInfo(PBOBJISignatureGetRefParmCount(&pMethodDescription),
rtThis);
    PBOBJIVarInfo
    VarFlagInfo(rtThis);
        PBOBJIBuildParameterList(
        rtThis,
        pConnect->SMIBlockPtrGet(),
        iParameters,
        pArgArray,
        pSmiParameters,
        psmidataReturnType,
        iStartingPBArguementNumber,
        &pMethodDescription,
        &RefInfo,
        VarFlagInfo,
        MemCollection
        );
        // release structure name (if we got one)
        pMethodDescription.ReleaseStructureName();
        LPSTR 1pszVarInfo;
        // if we are passing standalone arrays, get the var info flags (hex
string of flags)
        if(1pszVarInfo = VarFlagInfo.GetStringRepresentation())
        {
        pMethodDescription.MergeVarInfo(1pszVarInfo);
        }
        if(pConnect->SMIBlockPtrGet()->1ReturnCode) // check for
failure code before the call
        {
        rc = FALSE;
        }
        else
        rc = SMIClientInvokeObjectMethod(      // do the actual remote call
            pConnect->SMIBlockPtrGet(),
            pMethodDescription.GetSignatureString(),
            obidRemote,
            pSmiParameters);
        // MethodInvokeTrace(pConnect, psmiParameters, 1pszName,
obidRemote,1pszRemoteClass
            if (bTraceDSECalls)
            {
            CHAR szDummy[128];
            CHAR szData[128];
            LPSTR 1pszDummy;
            LPSTR 1pszAttrName = 0;
            LPSTR 1pszMethodName = 0;
            LPSTR 1pszData;
            LPSTR 1pszType = "Not implemented yet";
            INT iLooper;
            PSHLIST pParmList = pSmiParameters;
            PSMIDATA pSmiData = 0;
            PSMIDATA pSmiData2 = 0;
            pbstg_strncpy(szDummy, 1pszName,sizeof(szDummy) - 1);
            1pszDummy = szDummy;
            1pszData = szData;
            if (pbstg_strstr(1pszName, PBOBJIBuiltInPREFIX) == 1pszName) //
attribute access
            {
            BOOL bIsSet;
            // get past '@' sign
            1pszDummy ++;
            // attribute name is stored as the dataitem of 2nd parm in parmlist
            pSmiData = SMIGetFirstInterfaceItem(pSmiParameters);
            pSmiData2 = SMIGetNextInterfaceItem(pSmiparameters);
            1pszType = PBOBJIDecodeTypeToString(psmiData);
            1pszAttrName = (LPSTR) (pSmiData2->1pDataItem);
            bIsSet = !pbstg_memcmp(1pszDummy,
        PBOBJIBuiltInSETPARAMETER, pbstg_strlen
        (PBOBJIBuiltInSETPARAMETER));
            // "Get/Set (obj id) ClassName.AttributeName, Type: typename,
SUCCEEDED/FAILED"
        DPBTracePrintResourceMessageStart(pConnect->TraceInfoGet(),
        DPB_TRACE_IDS_6)
            (ULONG)obidRemote, (bIsSet ? : "Get"),
            1pszRemoteClass, 1pszAttrName, 1pszType,
            (rc ? "SUCCEEDED" : "FAILED")
            DPBTracePrintResourceMessageEnd();
            }
            else    // method invocation
            {
            // Extract methodname from signature
            1pszMethodName = pbstg_strstr(1pszDummy,
        PBOBJIBuiltInPREFIX);
            *1pszMethodName = 0;
```

-continued

```
    1pszMethodName = 1pszDummy = szDummy;
    // show parms
    for (pSmiData = SMIGetFirstInterfaceItem(pSmiParameters),
iLooper = 0;
    pSmiData != NULL;
    pSmiData = SMIGetNextInterfaceItem(pSmiParameters), iLooper ++)
    {
    1pszType = PBOBJIDecodeTypeToString(pSmiData);
    // Parm# out, Type: typestring, by Reference/Value
    if (iLooper)
    {
DPBTracePrintResourceMessageStart(pConnect->TraceInfoGet(),
DPB_TRACE_IDS_7)
    ,iLooper, 1pszType, (pSmiData->bDataByReference ? "Reference" :
"Value")
    DPBTracePrintResourceMessageEnd();
    }
    else // first parm, ie return value
    {
    // "Called: (obj id) ClassName.MethodName"
DPBTracePrintResourceMessageStart(pConnect->TraceInfoGet(),
DPB_TRACE_IDS_4)
    ,(ULONG)obidRemote, 1pszRemoteClass, 1pszMethodName
    DPBTracePrintResourceMessageEnd();
    // "Return Type: typename, SUCCEEDED/FAILED
DPBTracePrintResourceMessageStart(pConnect->TraceInfoGet(),
DPB_TRACE_IDS_8)
    ,1pszType, (rc ? "SUCCEEDED" : "FAILED")
    DPBTracePrintResourceMessageEnd();
    }
    } // for
    } // method invocation
    } // bTraceDSECalls
    if(rc == SUCCESS)
    {
    // update reference arguments
    RefInfo.BackPatch(pConnect->SMIBlockPtrGet(),pSmiParameters);
    }
    } // end of if we are not in the middle of a call already
        bAnErrorOccured =
pConnect- >ErrorProcessing(bRetryOperation,bValueWasReturned,
TRUE,bSendANullBack);
        pconnect->SetIncallStatus(FALSE);       // clear the in
method call flag
        if (bAnErrorOccured)
        rc = FAILURE;
        if(bSendANullBack || (rc == SUCCESS
&& !bValueWasReturned))
        {
        // pass the return value back
PBOBJIDeliverReturnValue(rtThis,psmidataReturnType,
&obReturnObjectInstance,bSendANullBack);
        }
        SMIDestroyInterface(pConnect->SMIBlockPtrGet(),
pSmiParameters);
        MemCollection.Release();
        }
    while(bRetryOperation);
    if(pConnect->QDestroyNow()) // if we defered destroying
the Connection until after the method
        // call then do it now.
        {
        // disconnect from the server
        pConnect->DisconnectServer();
        delete pConnect;
        pConnect = 0;
        }
    else if(pConnect->QDisconnectNow()) // if we defered disconnecting
until after the method call.
        {
        // disconnect from the server
        pConnect->DisconnectServer();
        pConnect = 0;
        }
    return rc;
    }
```

At the outset, the method establishes a "do" loop for resetting local variables and testing whether a call is in progress. If the method succeeds, it will only iterate through the loop once. After some additional housekeeping, the method will now proceed to allocate an array of SMI parameter buffers. There exists one entry in the list for each parameter. Thereafter, the method performs the actual remote call, as indicated by invocation of SMIClientInvokeObjectMethod call. If the call is successful, the method back patches the referenced parameters (i.e., updates the reference parameters or arguments). If an error occurs, on the other hand, an error script is invoked.

The method performs cleanup before returning. Steps include resetting the call status flag and passing back the return value. If the retry flag is set to true, the "do/while" loop will repeat for another iteration. Otherwise, the method performs final cleanup by destroying the connection (or selecting to defer disconnecting).

A method for setting up the result or return value for a remote function, SetupReturnDefinition, may be constructed as follows.

```
// routine to setup the result or return value for the remote function
// setup the passed smidata buffer as a variable to be returned from a
method call
PSHLIST PBOBJISetupReturnDefinition
(
PRT_THIS rtThis,
OBJIParmSignatureDecode FAR *pMethodDescription,
PSMIDATA psmidataReturnType,
PSMI_COMMAND psmi,
POB_DATA pobdata, // if the return value is a structure, then this
will be set to
// the structure instance
PBOBJIDeferMemoryRelease& MemCollection
)
{
PSHLIST pSmiParameters =
SMICreateInterface(psmi,
NULL);
// see if the return type is a structure
if(pMethodDescription->bIsReturnTypeAStructure())
{
LPSTR lpszStructureName = pMethodDescription->GetStructureName();
OB_INST_ID oid;
INT iResultCode = rt_create_obinst(rtThis,lpszStructureName,&oid);
if(SUCCESS != iResultCode)
{
PB_ASSERT(0 && "couldn't create structure");
}
OB_CLASS_HNDL class_hndl = ob_get_obinst_class_hndl
(rtThis,oid);
ob_set_data_obinst (pobdata, oid, class_hndl.class_id, FALSE);
ob_set_data_structure (rtThis, pobdata);
OBJIPOBDATAArg oFuncArg(rtThis,pobdata);
PBOBJIAddValueToParameterList(
rtThis,
psmi,
pSmiParameters,
&oFuncArg,
psmidataReturnType,
FALSE,
TRUE,
NULL,
TRUE, // set the force NULLS to on
MemCollection);
}
// determine the return data type
else
{
switch(pMethodDescription->GetReturnType())
{
default:
case NO_TYPE:
psmidataReturnType->iDataType = SMI_VOID;
break;
case ANY_TYPE: // we don't know what the type is yet
psmidataReturnType->iDataType = SMI_ANY;
psmidataReturnType->bDataByReference = 1; // indicate that we want it
```

```
back
psmidataReturnType->iDataLength = 0;
break;
case UINT_TYPE:
psmidataReturnType->iDataType = SMI_UINT;
psmidataReturnType->bPBHeapAllocate = 1;
psmidataReturnType->bFreeItemStg= 1;
psmidataReturnType->bDataByReference = 1; // indicate that we want it
back
psmidataReturnType->iDataLength = sizeof(USHORT);
break;
case BOOL_TYPE:
psmidataReturnType->iDataType = SMI_BOOLEAN;
psmidataReturnType->bPBHeapAllocate = 1;
psmidataReturnType->bFreeItemStg= 1;
psmidataReturnType->bDataByReference = 1; // indicate that we want it
back
psmidataReturnType->iDataLength = sizeof(SHORT);
break;
case CHAR_TYPE:
psmidataReturnType->iDataType = SMI_CHAR;
psmidataReturnType->bPBHeapAllocate = 1;
psmidataReturnType->bFreeItemStg= 1;
psmidataReturnType->bDataByReference = 1; // indicate that we want it
back
psmidataReturnType->iDataLength = sizeof(CHAR);
break;
case INT_TYPE:
psmidataReturnType->iDataType = SMI_INT;
psmidataReturnType->bPBHeapAllocate = 1;
psmidataReturnType->bFreeItemStg= 1;
psmidataReturnType->bDataByReference = 1; // indicate that we want it
back
psmidataReturnType->iDataLength = sizeof(SHORT);
break;
case LONG_TYPE:
psmidataReturnType->iDataType = SMI_LONG;
psmidataReturnType->bPBHeapAllocate = 1;
psmidataReturnType->bFreeItemStg= 1;
psmidataReturnType->bDataByReference = 1; // indicate that we want it
back
psmidataReturnType->iDataLength = sizeof(LONG);
break;
case FLOAT_TYPE:
psmidataReturnType->iDataType = SMI_REAL;
psmidataReturnType->bPBHeapAllocate = 1;
psmidataReturnType->bFreeItemStg= 1;
psmidataReturnType->bDataByReference = 1; // indicate that we want it
back
psmidataReturnType->iDataLength = sizeof(FLOAT);
break;
case DOUBLE_TYPE:
psmidataReturnType->iDataType = SMI_DOUBLE;
psmidataReturnType->bPBHeapAllocate = 1;
psmidataReturnType->bFreeeItemStg= 1;
psmidataReturnType->bDataByReference = 1; // indicate that we want it
back
psmidataReturnType->iDataLength = sizeof(DOUBLE);
break;
case ULONG_TYPE:
psmidataReturnType->iDataType = SMI_ULONG;
psmidataReturnType->bPBHeapAllocate = 1;
psmidataReturnType->bFreeItemStg= 1;
psmidataReturnType->bDataByReference = 1; // indicate that we want it
back
psmidataReturnType->iDataLength = sizeof(ULONG);
break;
case STRING_TYPE:
psmidataReturnType->iDataLength = SMI_STRING;
psmidataReturnType->bPBHeapAllocate = 1;
psmidataReturnType->bFreeItemStg= 1;
psmidataReturnType->bAllowLengthChange = 1;
psmidataReturnType->bDataByReference = 1; // indicate that we want it
back
psmidataReturnType->iDataLength = 0; // we don't know how long
the string will be
break;
case DATE_TYPE:
psmidataReturnType->iDataType = SMI_DATE;
psmidataReturnType->bPBHeapAllocate = 1;
psmidataReturnType->bFreeItemStg= 1;
psmidataReturnType->bDataByReference = 1; // indicate that we want it
back
psmidataReturnType->iDataLength = sizeof(SH_TIME);
break;
case TIME_TYPE;
psmidataReturnType->iDataType = SMI_TIME;
psmidataReturnType->bPBHeapAllocate = 1;
psmidataReturnType->bFreeItemStg= 1;
psmidataReturnType->bDataByReference = 1; // indicate that we want it
back
psmidataReturnType->iDataLength = sizeof(SH_TIME);
break;
case DATETIME_TYPE:
psmidataReturnType->iDataType = SMI_DATETIME;
psmidataReturnType->bPBHeapAllocate = 1;
psmidataReturnType->bFreeItemStg= 1;
psmidataReturnType->bDataByReference = 1; // indicate that we want it
back
psmidataReturnType->iDataLength = sizeof(SH_TIME);
break;
case BINARY_TYPE:
psmidataReturnType->iDataType = SMI_BLOB;
psmidataReturnType->bPBHeapAllocate = 1;
psmidataReturnType->bFreeItemStg= 1;
psmidataReturnType->bAllowLengthChange = 1;
psmidataReturnType->bDataByReference = 1; // indicate that we want it
back
psmidataReturnType->iDataLength = 0; // we don't know how long
the blob will be
break;
case DEC_TYPE:
psmidataReturnType->iDataType = SMI_DECIMAL;
psmidataReturnType->bPBHeapAllocate = 1;
psmidataReturnType->bFreeItemStg= 1;
psmidataReturnType->bDataByReference = 1; // indicate that we want it
back
psmidataReturnType->iDataLength = iPBOBIMaxDecimalBufferSize;
break;
}
SMIAddInterfaceItem(psmi,pSmiParameters,psmidataReturnType);
}
return pSmiParameters;
}
```

The method is invoked with the runtime context and the signature of the remote procedure call (which identifies its argument list). The POB_DATA argument, a PowerBuilder storage argument, is employed for returning a result which is a structure or an object. The method begins by creating an interface, by invoking SMICreateInterface. This creates the linked list which will manage the procedure call arguments. Next, the method examines the return type to determine if it is a structure. Otherwise, it determines a data type (e.g., integer, boolean, and the like) for the return value. Thereafter, the method invokes an AddValueToParameter-List subroutine, for storing context information about the return type. Further, information is stored indicating whether memory is already allocated for the return type (or does the service manager need to allocate memory). Together with this, the method also indicates whether the value is returned by value or by reference.

A BuildParameterList function is provided to build individual RemoteObject parameters into an intermediate form. In an exemplary embodiment, this may be constructed as follows.

```
// routine to build individual remote object parameters into their
intermediate
// non-PowerBuilder form
static void PBOBJIBuildParameterList
(
```

```
PRT_THIS rtThis,
PSMI_COMMAND psmi,
UINT iParameters,
POB_DATA pArgArray,
PSHLIST pSmiParameters,
PSMIDATA pSMIDataArray,
UINT iStartingPBArguementNumber,
OBJIParmSignatureDecode FAR* pMethodDescription,
OBJIPOBDATAReferenceInfo FAR* pRefInfo,
PBOBJIVarInfo& VarFlagInfo,
PBOBJIDeferMemoryRelease& MemCollection
)
{
PBO_DATA pArgument; // parameter passed in
PVOID pArray; // array of parameters passed in
PSMIDATA psmidata = 0;
OBJIPOBDATAArg oFuncArg(rtThis);
INT iIndexIntoBackPatchArray;
INT iIndexIntoOBDATARefPtrArray;
// setup for params passed by ref
pRefInfo->SetIndexForFirstSmiBackPatchSlot
(iIndexIntoBackPatchArray);
pRefInfo->SetIndexForFirstOBDATARefPtr
(iIndexIntoOBDATARefPtrArray);
// ptr to array which packages params -- array of "any types"
pArray = ot_access_refarg_array(rtThis,pArgArray);
// Get signature -- reflects params
pMethodDescription->GetFirstParameterType();
// loop all params
for (UINT i = iStartingPBArguementNumber;
i < iParameters;
i++,pMethodDescription->GetNextParameterType())
{
// get next
pArgument = ob_array_item(rtThis, pArray, i + 1);
// get ptr to it
oFuncArg.SetArg(pArgument);
// is this a ref param
BOOL bStickySMIReferenceFlag =
pMethodDescription->bIsCurrentParameterReference();
psmidata = &pSMIDataArray[i + 1];
if(pMethodDescription->bIsCurrentParameterStructure())
// is this parameter a structure or user object?
{ // see if we need to promote the object name to a
descendant name
// get name
LPSTR lpszStructureName = pMethodDescription->GetStructureName();
LPSTR lpszActualName = 0;
OB_CLASS_ID obClassIdSystem;
RT_CLASS_DESCRIP Descrip;
OB_INST_ID obinst;
OB_CLASS_HNDL obClassHndl;
// if descendant, change curr. name to descendant name
if(pMethodDescription->bIsCurrentParameterArray())
{
POB_ARRAY_INST arrayinst = ob_get_data_arrayinst (pArgument);
obClassHndl = ob_array_class_hndl(rtThis, arrayinst );
}
else
{
obinst = ob_get_data_obinst(pArgument);
obClassHndl = ob_get_obinst_class_hndl(rtThis,obinst);
}
if(SUCCESS ==
rtGetClassDescrip(rtThis,obClassHndl,&Descrip,&obClassIdSystem))
{
lpszActualName = Descrip.pchClassName;
}
if(pbstg_strcmpi(lpszActualName,lpszStructureName))
{
pMethodDescription->RenameStructure(lpszActualName); // use the new
class name
}
}
// Add to list
PBOBJIAddValueToParameterList(
rtThis,
psmi,
pSmiParameters,
&oFuncArg,
psmidata,
TRUE,
bStickySMIReferenceFlag,
&VarFlagInfo,
FALSE,
MemCollection
);
// Housekeeping for ref parms
// check if its passed by reference (references are passed to us by
value,
// but the any array is passed by reference so that we can update
the value
if(pMethodDescription->bIsCurrentParameterReference())
{
psmidata->bDataByReference = TRUE; // set the by reference flag
pRefInfo->SetNextSmiBackPatchSlot
(iIndexIntoBackPatchArray, psmidata);
pRefInfo->SetNextOBDATARefPtr
(iIndexIntoOBDATARefPtrArray,pArgument);
}
}
}
```

At the outset, the method performs housekeeping/setup for parameters passed by reference. An array has been allocated up front by the caller (of this function) to track all the "back" pointers. The housekeeping steps, in essence, reset the index into that array to the first element of the array. Back pointers in the array are set to point to the storage allocated with objects being passed by reference or address. Next, the method stores (locally) a pointer to the array which packages parameters. Internally, all parameters had been packaged into a flat array. Thereafter, the method gets the "signature" for the parameters; this reflects the parameter types. With this information, the method is now ready to loop through all parameters.

A "for" loop is established for looping through all parameters. Each iteration of the loop gets the "next" parameter. During execution of the loop, the method determines the name of the parameter or, if appropriate, a descendant name. Now, the method is ready to add the parameter information to a parameter value list. At the conclusion of the loop, the method has created an internal representation of the data associated with the parameters. After performing housekeeping for reference parameters, the method concludes.

The system is now ready to "marshall" the method parameters. Marshalling is the process whereby the parameters are flattened into a data buffer (i.e., as a byte stream). At a high level, this functionality is performed by MarshallMethodParms which may be constructed as follows.

```
/*
**********************************************************
* Name: MarshallMethodParms
* Synopsis: Flatten method call parameter data into buffer from
* interface list. Be sensitive to whether doing client or
* server marshalling as it relates to parameters by ref
* or value. pBuf points to start of Parmdata area
* Parmdata area layout is:
* INT ItemCount - 0 if no parms or return value
* INT iDispToNextItem;
* Item instance
* INT iDataType
* INT iDispToNextItem
* DATA DataBytes
*
* Returns: TRUE if parmlist successfully marshalled, FALSE if error
*
**********************************************************
*/
```

```
PBWINAPI(BOOL, MarshallMethodParms)
(
PSMI_COMMAND pSMI,
PSMI_ITEM pBuf,
PSHLIST pshParmList,
PCLIENT pcStg)
{
// . . . setup
pcStg->iParmCount = (INT) 0;
SET_SMITEM_TYPE(pBuf,(SHORT)0); // Note: this is NO LONGER
ITEMCOUNT
SET_SMITEM_LENGTH(pBuf,(LONG) 0); // This IS: initialize item
count
SET_SMITEM_LENGTH(pBuf,(LONG) 0); // This IS: initialize item
count
id ((pcStg->pCBuffer =
(PSMIDATA)shlist_get_first(pshParmList)) == NULL)
{
PB_ASSERT(pcStg->pCBuffer);
SET_SMI_ERROR(pSMI,BAD_PARMLIST,0)
return (FALSE);
}
// Result field is 1st in list - if not VOID, set DataByReference flag
if (pcStg->pCBuffer->iDataType != SMI_VOID)
pcStg->pCBuffer->bDataByReference = ON;
// point past item hdr
pcStg->pBufWrk =
(PSMI_ITEM) (((PCHAR)pcStg->pBuWrk) + DATAITEMHDR);
pcSTg->pMSG->iMsgLen += DATAITEMHDR;
// Subroutine call to Marshall
if (!Marshall(pSMI,pBuf,pshParmList,pcStg))
return (FALSE);
else
return (TRUE);
}
```

This method largely serves as a setup wrapper for another method, Marshall, which may be constructed as follows.

```
/*
************************************************************
*
* Name: Marshall
* Synopsis: marshall interface items into buffer
* Returns: TRUE if parmlist successfully un-marshalled, FALSE if
error
************************************************************
*/
PBWINAPI (BOOL, Marshall)
PSMI_COMMAND PSMI,
PSMI_ITEM pBuf,
PSHLIST pshParmList,
PCLIENT pcStg)
{
// while elements in the linked list . . .
while (pcStg->pCBuffer)
{
// special case nested
// if item begins structure get nested list (unless the structure
is null)
while (pcStg->pCBuffer->bItemStartStruct &&
pcStg->pCBuffer->iDataType != SMI_STRUCT_WITH_NULL)
// insert placeholder into buffer . . . treat as void/with_null
SET_SMITEM_TYPE
(pcStg->pBufWrk, pcStg->pCBuffer->iDataType);
SET_SMITEM_LENGTH(pcStg->pBufWrk, (DATAITEMHDR +
PcStg->pCBuffer->iDataLength));
pcStg->pBufWrk = (PSMI_ITEM) (((PCHAR)pcStg->pBufWrk) +
DATAITEMHDR);
pcStg->pMSG->iMsgLen += DATAITEMHDR;
pcStg->iParmCount++; // account for structure beginning item
pcStg->pshSNest (pcStg->iNestLvl) = pshParmList;
pcStg->bStruct = TRUE;
pshParmList = (PSHLIST) pcStg->pCBuffer->lpDataItem;
if (!pshParmList ||
!(pcStg->pCBuffer = (PSMIDATA)shlist_get_first(pshParmList)))
{
PB_ASSERT(pshParmList);
SET_SMI_ERROR
(pSMI,INTERFACE_MISMATCH,ALLOC_ERR_MSG)
return (FALSE);
}
pcStg->iNestLvl++;
if (pcStg->iNestLvl == MAX_NEST);
{
PB_ASSERT(pcStg->iNestLvl < MAX_NEST);
SET_SMI_ERROR
(pSMI,INTERFACE_MISMATCH,ALLOC_ERR_MSG)
return (FALSE);
}
}
// Will it fit in buffer?
// if item will exceed MAXMSG length, get another buffer to hold
1st fragment
if((pcStg->pMSG->iMsgLen + (pcStg->pCBuffer->iDataLength +
DATAITEMHDR)) >= MAXMSG)
{
// if not marshalling: i.e. if parm is call-by-value unless on client
// don't get another buffer
if (pcStg->bMarshallingType == CLIENT_MARSHALLING
|| (pcStg->pCBuffer->bDataByReference))
{
// Mark end of current buffer
SET_SMITEM_TYPE
(pcStg->pBufWrk, (SHORT) SMI_END_OF_BUFFER);
pcStg->pMSG->iMsgLen += sizeof(SHORT) + (2 * DATAITEMHDR);
// Get another buffer
pcStg->pMSG = SMIGetMSGBuffer(pSMI,pcStg->pMSG);
if (!pcStg->pMSG)
{
SET_SMI_ERROR
(pSMI,INTERFACE_MISMATCH,ALLOC_ERR_MSG)
return (FALSE);
}
pcStg->pBufWrk = (PSMI_ITEM) (((PCHAR) pcStg->pMSG) +
SECONDARY_BUFFER_HDR);
if ((pcStg->pCBuffer->iDataLength + DATAITEMHDR) < MAXMSG )
pcStg->pMSG->iMsgLen += (2 * SECONDARY_BUFFER_HDR);
}
}
// By type . . .
switch(pcStg->pCBuffer->iDataType)
{
case SMI_VOID:
case SMI_ANY_WITH_NULL:
case SMI_STRING_WITH_NULL:
case SMI_INT_WITH_NULL:
case SMI_LONG_WITH_NULL:
case SMI_UINT_WITH_NULL:
case SMI_ULONG_WITH_NULL:
case SMI_DECIMAL_WITH_NULL:
case SMI_REAL_WITH_NULL:
case SMI_DOUBLE_WITH_NULL:
case SMI_BOOLEAN_WITH_NULL:
case SMI_CHAR_WITH_NULL:
case SMI_BLOB_WITH_NULL:
case SMI_DATE_WITH_NULL:
case SMI_TIME_WITH_NULL:
case SMI_DATETIME_WITH_NULL:
case SMI_STRUCT_WITH_NULL:
// Set type and length
SET_SMITEM_TYPE
(pcStg->pBufWrk,pcStg->pCBuffer->iDataType);
SET_SMITEM_LENGTH(pcStg->pBufWrk,DATAITEMHDR);
// ptr to byte stream itself
pcStg->pBufWrk = (PSMI_ITEM) ((PCHAR)pcStg->pBufWrk) +
DATAITEMHDR);
pcStg->pMSG->iMsgLen += DATAITEMHDR;
// Track num of params passed
pcStg->iParmCount++;
break;
case SMI_ANY:
case SMI_CHAR:
case SMI_DECIMAL:
case SMI_STRING:
case SMI_DATE:
case SMI_TIME:
```

```
case SMI_DATETIME:
case SMI_BLOB:
// Handling for ptr array (used for these types)
SET_SMITEM_TYPE(pcStg->pBufwrk,pcStg->pCBuffer->iDataType);
// if parm is call-by-value && not on client entry length =
DATAITEMHDR
if (pcStg->bMarshallingType == CLIENT_MARSHALLING
|| (pcStg->pCBuffer->bDataByReference))
SET_SMITEM_LENGTH(pcStg->pBufWrk, (DATAITEMHDR +
pcStg->pCBuffer->iDataLength));
else
{
SET_SMITEM_LENGTH(pcStg->pBufWrk, DATAITEMHDR);
pcStg->pCBuffer->iDataLength = 0;
}
pcStg->pBufWrk = (PSMI_ITEM) (((PCHAR)pcStg->pBufWrk) +
DATAITEMHDR);
// Don't marshall if parm is call-by-value unless on client
if (PcStg->bMarshallingType == CLIENT_MARSHALLING
|| (pcStg->pCBuffer->bDataByReference))
{
if (pcStg->pCBuffer->iDataLength > 0)
if (PcStg->pCBuffer->iDataLength >= MAXMSG)
{
pcStg->pItemPtr = pcStg->pCBuffer->lpDataItem;
pcStg->lTotalLength = pcStg->pCBuffer->iDataLength;
if (!SMIMarshallLargeItem(pSMI,pcStg->pMSG,pcStg))
SET_SMI_ERROR
(pSMI,INTERFACE_MISMATCH,ALLOC_ERR_MSG)
return (FALSE);
}
// Re-establish current buffer
while (pcStg->pMSG->NextBuf)
{
pcStg->pMSG = (PCS_MSG) pcStg->pMSG->NextBuf;
}
// pcStg->pMSG->iMsgLen set by SMIMarshallLargeItem
pcStg->pBufwrk = (PSMI_ITEM) (((PCHAR)pcStg->pMSG) +
pcStg->pMSG->iMsgLen);
pcStg->iParmCount++;
break;
}
else
pbstg_huge_memcpy(pcStg->pBufWrk,
pcStg->pCBuffer->lpDataItem,
pcStg->pCBuffer->iDataLength);
}
else
if (PcStg->pCBuffer->iDataLength > 0)
if (pcStg->pCBuffer->iDataLength >= MAXMSG)
{
pcStg->pBufwrk = (PSMI_ITEM) (((PCHAR)pcStg->pBufWrk) -
DATAITEMHDR);
SET_SMITEM_LENGTH(pcStg->pBufwrk, DATAITEMHDR);
if (!pcStg->pMSG->iMsgLen)
pcStg->pMSG->iMsgLen +=
GET_SMITEM_LENGTH(pcStg->pBufWrk) + (2 * DATAITEMHDR);
else
pcStg->pMSG->iMsgLen +=
GET_SMITEM_LENGTH(pcStg->pBufWrk);
pcStg->pBufWrk = (PSMI_ITEM) ((PCHAR)pcStg->pBufWrk) +
DATAITEMHDR);
pcStg->iParmCount++;
break;
}
// add parameter len to length of message
pcStg->pMSG->iMsgLen += (pcStg->pCBuffer->iDataLength +
DATAITEMHDR);
pcStg->pBufWrk = (PSMI_ITEM) (((PCHAR)pcStg->pBufWrk) +
pcStg->pCBuffer->iDataLength);
pcStg->iParmCount++;
break;
case SMI_INT: // PB type INT = C SHORT
case SMI_LONG: // PB type LONG = C LONG
case SMI_UNIT: // PB type UNIT = C USHORT
case SMI_ULONG: // PB type ULONG = C ULONG
case SMI_REAL: // PB type REAL = C FLOAT
case SMI_DOUBLE: // PB type DOUBLE = C DOUBLE
case SMI_BOOLEAN: // PB type BOOLEAN = C SHORT
SET_SMITEM_TYPE
(psStg->pBufWrk, pcStg->pCBuffer->iDataType);
SET_SMITEM_LENGTH(pcStg->pBufWrk,(DATAITEMHDR +
pcStg->pCBuffer->iDataLength));
pcStg->pBufWrk = (PSMI_ITEM) (((PCHAR)pcStg->pBufWrk) +
DATAITEMHDR);
// Don't marshall if parm is call-by-value unless on client
if (pcStg->bMarshallingType == CLIENT_MARSHALLING
|| (pcStg->pCBuffer->bDataByReference))
{
id (pcSAtg->pCBuffer->lpDataItem != NULL)
{
id (pcStg->pCBuffer->iDataLength == sizeof(SHORT))
{ // i.e. 2 byte binary
if (pcStg->pCBuffer->iDataType == SMI_INT
|| pcStg->pCBuffer->iDataType == SMI_BOOLEAN)
SET_SMITEM_DATA_SHORT(pcStg->pBufWrk,
((SHORT) *((SHORT FAR*)
pcStg->PCBuffer->lpDataItem)));
if (pcStg->pCBuffer->iDataType == SMI_UINT)
SET_SMITEM_DATA_USHORT(pcStg->pBufWrk,
((USHORT) *((USHORT FAR*)
PcStg->pCBuffer->lpDataItem)));
}
if (pcStg->pCBuffer->iDataLength == sizeof(LONG))
{ // i.e. 4 byte binary
if (pcStg->pCBuffer->iDataType == SMI_LONG)
SET_SMITEM DATA_LONG(pcStg->pBufWrk,
((LONG) *((LONG FAR*)
pcStg->pCBuffer->lpDataItem)));
if (pcStg->pCBuffer->iDataType == SMI_ULONG)
SET_SMITEM_DATA_ULONG(pcStg->pBufWrk,
((ULONG) *((ULONG FAR*)
pcStg->pCBuffer->lpDataItem)));
if (PcStg->PCBuffer->iDataType == SMI_REAL)
SET SMITEM_DATA_FLOAT(pcStg->pBufWrk,
((FLOAT) *((FLOAT FAR*)
pcStg->pCBuffer->lpDataItem)));
}
// i.e. 8 byte binary
if (pcStg->pCBuffer->iDataLength == sizeof(DOUBLE))
if (pcStg->pCBuffer->iDataType == SMI_DOUBLE)
SET_SMITEM_DATA_DOUBLE(pcStg->pBufWrk,
((DOUBLE) *((DOUBLE FAR*)
pcStg->PCBuffer->lpDataItem)));
}
}
pcStg->pBufWrk = (PSMI_ITEM) (((PCHAR)pcStg->pBufWrk) +
pcStg->pCBuffer->iDataLength);
// add parameter len to length of message
pcStg->pMSG->iMsgLen += (pcStg->pCBuffer->iDataLength +
DATAITEMHDR);
pcStg->iParmCount++;
break;
case SMI_ARRAY:
// Call special array handler -- support for NULLs
if (!SMIMarshallArray(pSMI,pcStg->pMSG,pcStg->pBufWrk,pcStg))
{
SET_SMI ERROR
(pSMI,INTERFACE_MISMATCH,ALLOC_ERR_MSG)
return (FALSE);
}
// pcStg->pCurrBufPtr set by SMIUnMarshallArray
pcStg->pBufWrk = (PSMI_ITEM) (LPVOID) pcStg->pCurrBufPtr);
break;
default:
break;
}
pcStg->pCBuffer = (PSMIDATA)shlist_get_next(pshParmList);
if (pcStg->pCBuffer == NULL)
if (pcStg->bStruct) we just completed a structure
{
pcStg->iNestLvi--;
if (pcStg->iNestLvl >= 0)
{
pshParmList = pcStg->pshSNest[pcStg->iNestLvl];
// if null list, we are marshalling array of struct . . . return
if (!pshParmList)
save current buffer pointer
pcStg->pCurrBufPtr = (LPVOID) pcStg->pBufWrk;
return(TRUE);
```

```
}
pcStg->pCBuffer = (PSMIDATA)shlist_get_next(pshParmList);
}
else
pcStg->bStruct = FALSE;
}
if (pcstg->pCBuffer == NULL)
break;
    }
}
// store item count for all marshalled buffers
SET_SMITEM_LENGTH(pBuf,pcStg->iParmCount);
// save current buffer pointer
pcStg->pCurrBufPtr = (LPVOID) pcStg->pBufWrk;
return(TRUE);
}
```

Within the Marshall method, a "while" loop is established before traversing the parameter list. Within the loop, additional processing is performed on any nested data types (e.g., structures or records), for getting a corresponding nested list (for those nested values). The parameter data is now ready for placing within buffers. How the values are actually placed within various buffers depends on the underlying data type for the parameter. This processing is provided by the switch statement, which switches on data type. Based on the type, each value is taken from the list and packaged into the byte stream. During this process, the method keeps track of the number of parameters added as well as the size of data which needs to be written.

Complementing marshalling is the process of "unmarshalling." Unmarshalling is the specific process of unpacking the information out of the buffer and storing it into the corresponding interface definition.

The task of sending a request will be illustrated in the context of a particular driver. To send a request to a named pipes server, for instance, the system employs a SendRequest method; it may be constructed as follows.

```
/*
***************************************************************
Name: SendRequest
Synopsis: Send a request to NP AppServer thread
Returns: Nothing.
***************************************************************
*/
PBCALLBACK (VOID, DPBSendRequest)
(
PSMI_COMMAND pSMI)
{
LONG lpServerThreadID = NULL;
HANDLE hThread = NULL;
DWORD dwRC = NULL;
WTRC wstg;
PWTRC pWstg = &wstg;
#ifdef NP_SERVER_INCLUDED
LONG lThreadCount = 0;
SYSTEM_INFO SysInfo;
DWORD dwMinProcesses = 1;
#endif
// Init
if (SMILOCK == NULL)
GETSMI;
PB_ASSERT(pSMI->pSrvStat);
// Prep for locking of the RPC
CLIENT_RPC(dwRC,pWstg->errbuf);
// Trace . . .
if (DPBTraceQueryOption(pSMI->pTRACE,bALLTrace))
{
if (LoadString(hInst,(DNPBASE + DNPC000),
pWstg->formatbuf,MAX_LINE))
wsprintf
(pWstg->errbuf,pWstg->formatbuf,SMI_USER,GetCurrentThreadId( ));
DpBTracePrintText(pSMI->pTRACE,.(CHAR *) &pWstg->errbuf);
}
// For client straight func call; for server spawn new thread
PB_THREAD_CREATE ((LPSECURITY_ATTRIBUTES)NULL,
(DWORD) 0,
// Actual send request
(LPTHREAD_START_ROUTINE) PipeRequestProc,
pSMI,
(DWORD) 0,
(LPDWORD) &lpServerThreadID);
// Wait on lock (for thread to say it initialized properly)
CLIENT_RPC_WAIT(dwRC,pWstg->errbuf);
// Server version handle killing spawned threads at shutdown
#ifdef NP_SERVER_INCLUDED
if (pSMI->pCmd)
{
if (pSMI->pCmd->iMsgType == SHUTDOWN_DRIVER)
{
// trace . . .
if (DPBTraceQueryOption(pSMI->pTRACE,bALLTrace))
{
if (LoadString(hInst, (DNPBASE +
DNPS080),pWstg->formatbuf,MAX_LINE))
wsprintf
(pWstg->errbuf,pWstg->formatbuf,SMI_USER,GetcurrentThreadId( ));
DPBTracePrintTest(pSMI->pTRACE,(CHAR *) &pWstg->errbuf);
}
GetSystemInfo (&SysInfo);
dwMinProcesses = 2 * SysInfo.dwNumberOfProcessors;
// force a yield to let accepting threads to terminate
Sleep(0);
// now try a few times to see if threads will go to 0,
// give about a second for each thread that we have outstanding
for (1ThreadCount = dwMinProcesses; 1ThreadCount > 0;
1ThreadCount--)
{
LOCKSMISTAT;
if (pSMI->pSrvStat->1ServerThreads == 0)
{
   UNLOCKSMISTAT;
   return;
}
UNLOCKSMISTAT;
// give it 2 seconds before checking again
Sleep(2000);
    }
}
}
#endif
}
```

After initial thread management/housekeeping steps, the method performs the actual send request (here, PipeRequestProc for a named pipe driver). A complementary routine is present on the server, for servicing the call. At the server, a new thread of execution is spawned for servicing the call.

The PipeRequestProc method, on the other hand, may be implemented as follows.

```
/***************************************************************
*
* PROCEDURE: PipeRequestProc (SMI_COMMAND pSMI)
*
* PURPOSE:
* This thread function processes individual pipe requests
*
\***************************************************************/
VOID PipeRequestProc
(
PSMI_COMMAND pSMI)
{
PNP_WSTG pWstg; // Working storage instance pointer
UINT rc;
DWORD RC = NULL;
DWORD dwRC = NULL;
```

```
CHAR errbuf[MAX_LINE] = {0};
// As long as Client is single-threading request using
    CLIENT_RPC macro
// it shouldn't be necessary to lock SMI object for Read/Writes, undef
LOCK/UNLOCK
// this isn't true when code is included and called by NP Server DLL
#ifndef NP_SERVER_INCLUDED
#ifdef LOCKSMI
#undef LOCKSMI
#undef UNLOCKSMI
#define LOCKSMI
#define UNLOCKSMI
#endif // #def LOCKSMI
#endif // #ifndef NP_SERVER_INCLUDED
// Get memory for comm driver -- working heap for thread
pWstg = GlobalAlloc(GPTR,sizeof(NP_WSTG));
if (pWstg == NULL) // fail alloc
{
LOCKSMI;
pSMI->lLastError = GetLastError( );
pSMI->lReturnCode = ALLOC_ERR_WSTG;
UNLOCKSMI;
// release lock -- let client continue
CLIENT_RPCRTN(dwRC,pWstg->errbuf);
PB_EXIT_THREAD(ALLOC_ERR_WSTG,errbuf);
}
// trace . . .
if (DPBTraceQueryOption(pSMI->pTRACE,bALLTrace))
{
if (LoadString(hInst,(DNPBASE + DNPC010),
pWstg->formatbuf,MAX_LINE))
wsprintf
(pWstg->errbuf,pWstg->formatbuf,SMI_USER,GetCurrentThreadId( ));
DPBTracePrintText(pSMI->pTRACE,(CHAR *) &pWstg->errbuf);
}
// Keep list of memory objects
// anchor memory instance info for subsequent allocs
LOCKSMI;
pWstg->hMemObj[0] = pWstg;
pWstg->iMemIx = 0;
if (pSMI->szpBComputer == "") // if no name provided force local
pSMI->szpBComputer[0] = '.';
// construct name of pipe
wsprintf (pWstg->PipeName,
"%s%s%s%s",
"\\\\",pSMI->szpBComputer, "\\PIPE\\",pSMI->szPBAppname);
// output buffer = request
pWstg->pOMsg = pSMI->pCmd;
pWstg->iSize = MAX_NET_SIZE;
pWstg->iMsgSize = pWstg->pOMsg->iMsgLen;
UNLOCKSMI;
//
//* Allocate input buffer . . . output buffer(s) address passed in on request
//
SMI_GET_MSG(pWstg->pIMsg); // get I/O buffer
dwRC = GetVersion( );
// Overlap I/O (Win 32) or not
#if defined (PBWIN32)
if (dwRC < 0x80000000)
// Windows NT
pWstg->bIsWin40 = FALSE;
else
if (LOBYTE(LOWORD(dwRC)) < 4)
// Win32s
pWstg->bIsWin40 = FALSE;
else
// Windows 95
pWstg->bIsWin40 = TRUE;
#else
// Win16
pWstg->bIsWin40 = FALSE;
#endif
// Retry loop
RetrySend:
pWstg->bRequestError = FALSE; // Clear error flag
// Housekeeping for named pipe
BUMPSTATCOUNTUP (lServerCalls)
if (!pSMI->hServerConnection)
{
if (!pWstg->bIsWin40)

pWstg->hPipe = CreateFile (pWstg->PipeName, // Pipe name.
GENERIC_WRITE // Generic access, read/write.
| GENERIC_READ,
FILE_SHARE_READ // Share both read and write.
FILE_SHARE_WRITE ,
NULL, // No security.
OPEN_EXISTING, // Fail if not existing.
FILE_FLAG_OVERLAPPED, // Use overlap.
NULL); // No template.
else
pWstg->hPipe = CreateFile (pWstg->PipeName, // Pipe name.
GENERIC_WRITE // Generic access, read/write.
| GENERIC_READ,
FILE_SHARE_READ // Share both read and write.
| FILE_SHARE_WRITE ,
NULL, // No security.
OPEN_EXISTING, // Fail if not existing.
NULL, // Don't use overlap.
NULL); // No template.
if (pWstg->hPipe == INVALID_HANDLE_VALUE
|| pWstg->hPipe == NULL)
{
pWstg->retCode = GetLastError( );
// pipe wasn't found . . . server named pipe not active
if ((pWstg->retCode == ERROR_SEEK_ON_DEVICE) ||
(pWstg->retCode == ERROR_FILE_NOT_FOUND))
{
BUMPSTATCOUNTUP (lTotalServerWriteErrors)
LOCKSMI;
if (pSMI->pCmd->iMsgType != SHUTDOWN_DRIVER)
{
pSMI->lLastError = pWstg->retCode;
pSMI->lReturnCode = SERVER_NOT_ACTIVE;
}
else
{
pSMI->lReturnCode = 0L;
pSMI->lLastError = 0L;
}
UNLOCKSMI;
if (DPBTraceQueryOption (pSMI->pTRACE,bALLTrace)
&& DPBTraceQueryOption (pSMI->pTRACE,bDNPLife)
&& pSMI->pCmd->iMsgType != SHUTDOWN_DRIVER)
{
if (LoadString(hInst, (DNPBASE +
DNPC020),pWstg->formatbuf,MAX_LINE))
wsprintf (pWstg->errbuf, pWstg->formatbuf, SMI_USER,
GetCurrentThreadId( ),pSMI->lLastError);
DPBTracePrintText(pSMI->pTRACE,pWstg->errbuf);
}
CLIENT_RPCRTN(dwRC,pWstg->errbuf);
FreeAllThreadMem pWstg);
PB_EXIT_THREAD(CREATE_FILE_ERROR,errbuf);
}
else
if (pWstg->retCode == ERROR PIPE_BUSY)
if (PSMI->pCmd->iMsgType == SHUTDOWN_DRIVER)
{
pSMI->lReturnCode = 0L;
pSMI->lLastError = 0L;
CLIENT_RPCRTN(dwRC,pWstg->errbuf);
FreeAllThreadMem(pWstg);
PB_EXIT_THREAD(0,errbuf);
}
if (DPBTraceQueryOption(pSMI->pTRACE,bALLTrace)
&& DPBTraceQueryOption(pSMI->pTRACE,bDNPLife))
{
if (LoadString(hInst, (DNPBASE +
DNPC030),pWstg->formatbuf,MAX_LINE))
wsprintf (pWstg->errbufWstg->formatbuf,SMI_USER,
GetCurrentThreadId( ));
DPBTracePrintText(pSMI->pTRACE,pWstg->errbuf);
}
// Return code
rc = WaitNamedPipe(pWstg->PipeName,
NMPWAIT_USE_DEFAULT_WAIT);
if (!rc)
{
// Check error
rc = GetLastError( );
```

```
if ((rc == ERROR_PIPE_BUSY)
&& pSMI->pCmd->iMsgType != SHUTDOWN_DRIVER)
{
pSMI->lReturnCode = SERVER_BUSY;
pSMI->lLastError = pWstg->retCode;
}
else
{
pWstg->retCode = GetLastError( );
LOCKSMI;
if (pSMI->pCmd->iMsgType != SHUTDOWN_DRIVER)
{
pSMI->lReturnCode = CREATE_FILE_ERROR;
pSMI->lLastError = pWstg->retCode;
}
else
{
pSMI->lReturnCode = 0L;
pSMI->lLastError = 0L;
}
UNLOCKSMI;
BUMPSTATCOUNTUP (lTotalClientWriteErrors)
if (DPBTraceQueryOption(pSMI->pTRACE,bALLTrace)
&& DPBTraceQueryOption(pSMI->pTRACE,bDNPLife)
&& pSMI->pCmd->iMsgType != SHUTDOWN_DRIVER)
{
if (LoadString(hInst, (DNPBASE +
DNPC040),pWstg->formatbuf,MAX_LINE))
wsprintf (pWstg->errbuf, pWstg->formatbuf,SMI_USER,
GetCurrentThreadId( ),pWstg->retCode);
DPBTracePrintText(pSMI->pTRACE,pWstg->errbuf);
}
}
// Return and clean up
CLIENT_RPCRTN(dwRC,pWstg->errbuf);
FreeAllThreadMem(pWstg);
PB_EXIT_THREAD(CREATE_FILE_ERROR,errbuf);
}
else
{
// Retryable error
BUMPSTATCOUNTUP (lTotalClientWriteRetry)
pSMI->hServerConnection = NULL;
// Loop again
goto RetrySend;
}
}
LOCKSMI;
pSMI->lReturnCode = CREATE_FILE_ERROR;
pSMI->lLastError = pWstg->retCode;
UNLOCKSMI;
if (DPBTraceQueryOption(pSMI->pTRACE,bALLTrace)
&& DPBTraceQueryOption(pSMI->pTRACE,bDNPLife))
{
if (LoadString(hInst,(DNPBASE +
DNPC050),pWstg->formatbuf,MAX_LINE))
wsprintf (pWstg->errbuf, pWstg->formatbuf, SMI_USER,
GetCurrentThreadId( ) ,pSMI->lLastError);
DPBTracePrintText (pSMI->pTRACE, pWstg->errbuf);
}
CLIENT_RPCRTN(dwRC,pWstg->errbuf);
FreeAllThreadMem(pWstg);
PB_EXIT_THREAD(CREATE_FILE_ERROR,errbuf);
}
}
// Server connection is OK
else
pWstg->hPipe = pSMI->hServerConnection;
//
//* Create and init overlapped structure for writes.
//
pbstg_memset (&pWstg->OverLapWrt, 0, sizeof(OVERLAPPED));
if (!pWstg->bIsWin40)
{
pWstg->hEventWrt = CreateEvent (NULL, TRUE, FALSE, NULL);
pWstg->OverLapWrt.hEvent = pWstg->hEventWrt;
}
//
//* Send (Write) Request
//
pWstg->pFirstMsg = pWstg->pOMsg;
pWstg->bMultiBufIO = FALSE;
WriteNext:
BUMPSTATCOUNTUP (lTotalClientWrites)
if (!pWstg->bIsWin40)
// Actual write (overlap)
pWstg->retCode = WriteFile (pWstg->hPipe,
pWstg->pOMsg,
pWstg->iMsgSize,
(LPDWORD) &pWstg->bytesWritten,
&pWstg->OverLapWrt);
else
// Actual write (non-overlap)
pWstg->retCode = WriteFile (pWstg->hPipe,
pWstg->pOMsg,
pWstg->iMsgSize,
(LPDWORD)&pWstg->bytesWritten,
NULL);
if (!pWstg->retCode) // Wait on overlapped if need be.
{
pWstg->lastError = GetLastError( );
if (pWstg->lastError == ERROR_IO_PENDING)
{
// If pending, wait on event
RC = WaitForSingleObject(pWstg->hEventWrt,INFINITE);
RC = GetOverlappedResult (pWstg->hPipe,
&pWstg->OverLapWrt,
&pWstg->bytesTransRd,
FALSE);
}
else
{
// Other type of error
BUMPSTATCOUNTUP (lTotalClientWriteErrors)
BUMPSTATCOUNTUP (lTotalClientWriteRetry)
if ((DPBTraceQueryOption(pSMI->pTRACE,bALLTrace)
&& DPBTraceQueryOption(pSMI->pTRACE,bDNPLife))
&& pSMI->pCmd->iMsgType != SHUTDOWN DRIVER)
{
if (LoadString(hInst, (DNPBASE +
DNPC060),pWstg->formatbuf,MAX_LINE))
wsprintf (pWstg->errbuf,pWstg->formatbuf, SMI_USER,
GetCurrentThreadId( ),pSMI->lLastError);
DPBTracePrintText(pSMI->pTRACE,pWstg->errbuf);
}
// if (pSMI->pCmd->iMsgType == SHUTDOWN_DRIVER)
pSMI->hServerConnection = NULL;
pWstg->pOMsg = pWstg->pFirstMsg;
// Loop again
goto Retrysend;
}
// bytes xmitted
if (pWstg->bytesTransRd)
UPDSTATS (lTotalClientBytesWritten, pWstg->bytesTransRd)
}
UPDSTATS (lTotalClientBytesWritten, pWstg->bytesWritten)
// Write next block in buffer chain (if any)
if (pWstg->pOMsg->NextBuf)
{
pWstg->pOMsg = (PCS_MSG) pWstg->pOMsg->NextBuf;
pWstg->iMsgSize = MAX_NET_SIZE;
pWstg->bMultiBufIO = TRUE;
goto WriteNext;
}
else
{
pWstg->pOMsg = pWstg->pFirstMsg;
pWstg->bMultiBufIO = FALSE;
}
//
//* Read server response to request
//
ReadPipe(pWstg, pSMI);
if (pWstg->bRequestError)
{
BUMPSTATCOUNTUP (lTotalClientReadRetry)
goto RetrySend;
}
//
//* Signal caller of Request completion
```

```
//
if (pWstg->bytesRead > 0)
// Shut down transport request
if (pWstg->pIMsg->iMsgType == SHUTDOWN_DRIVER)
goto RetrySend;
SMI_FREE_MSGS(pWstg->pOMsg);
LOCKSMI;
pSMI->pCmd = pWstg->pIMsg;
if (pWstg->pIMsg->ErrorStack.ErrorSet)
pSMI->lReturnCode = SMI_CALL_ERROR;
UNLOCKSMI;
}
else
{
// trace . . .
if (DPBTraceQueryOption(pSMI->pTRACE,bALLTrace)
&& DPBTraceQueryOption(pSMI->pTRACE,bDNPLife))
{
if (LoadString(hInst, (DNPBASE +
DNPC070) ,pWstg->formatbuf,MAX_LINE))
wsprintf (pWstg->errbuf,pWstg->formatbuf, SMI_USER,
GetCurrentThreadId( ),GetLastError( ));
DPBTracePrintText(pSMI->pTRACE,pWstg->errbuf);
}
// Request didn't complete, set code
pSMI->lReturnCode = SMI_REQUEST_INCOMPLETE;
}
// Shut down pipe if thread does not need to be kept open
if (!pWstg->bDedicateThread)
CloseHandle (pWstg->hPipe);
if (!pWstg->bIsWin40)
{
CloseHandle (pWstg->hEventRd);
CloseHandle (pWstg->hEventWrt);
}
// Cleanup
CLIENT_RPCRTN(dwRC,pWstg->errbuf);
FreeAllThreadMem(pWstg);
// and exit
PB_EXIT_THREAD(0,errbuf);
}
```

As shown, the driver includes a call to place the request on the wire (i.e., network).

Appended herewith as Microfiche Appendix A are additional source listings providing further description of the present invention.

While the invention is described in some detail with specific reference to a single preferred embodiment and certain alternatives, there is no intent to limit the invention to that particular embodiment or those specific alternatives. Thus, the true scope of the present invention is not limited to any one of the foregoing exemplary embodiments but is instead defined by the appended claims.

What is claimed is:

1. In a distributed computing system comprising at least one client in communication with at least one server, a method for executing a distributed application comprising distributed application objects, the method comprising:

for a particular application object of said distributed application, creating at a particular client a proxy object corresponding to said particular application object, said proxy object comprising an interface definition for said particular application object thereby allowing said particular client to invoke methods of a remote object that implements said particular application object;

creating at a particular server said remote object, said remote object providing a run-time instantiation of said particular application object and including properties and methods of said particular application object;

establishing a connection between said particular client and said particular server;

executing at the particular client an application which requires services of said particular application object; and in response to requests from the particular client for invoking services of said particular application object, invoking the proxy object at the particular client, whereupon the proxy object invokes corresponding services at the remote object and, thereafter, returns results back to said application.

2. The method of claim 1, wherein said remote object comprises a non-visual object instantiated from an object-oriented class.

3. The method of claim 2, wherein said remote object comprises properties stored as object data, together with access to methods defined by the class.

4. The method of claim 3, wherein the proxy object comprises an interface providing access to the object data and class methods available at the remote object.

5. The method of claim 1, wherein said creating a proxy object step includes assigning an alias to the proxy object for differentiating it from the corresponding remote object.

6. The method of claim 1, further comprising:
storing a copy of the remote object locally at the client, so that the executing application can invoke a local copy of the remote object, as desired.

7. The method of claim 6, wherein said application determines during runtime execution which version of the remote object to invoke.

8. The method of claim 1, wherein said remote object comprises a non-visual object contained within a visual object.

9. The method of claim 1, further comprising:
deploying the application at the particular client with a copy of the remote object, so that said particular client can function as a server for yet another client.

10. The method of claim 1, wherein said executing step includes:
receiving a request from the application at the proxy object for invoking a particular method of the remote object, said request specifying a list of parameters by which the particular method is to be invoked.

11. The method of claim 10, wherein said parameters include data members passed by value.

12. The method of claim 10, wherein said parameters include data members passed by reference.

13. The method of claim 10, wherein said parameters include nested data members.

14. The method of claim 10, further comprising:
packing said parameter list into a byte stream for transport across a network to the remote object.

15. The method of claim 1, wherein said proxy object includes stubs for methods which exist at the remote object.

16. The method of claim 1, wherein a plurality of proxy objects are created at various clients in communication with the server, all such proxy objects referencing corresponding remote objects residing at the particular server.

17. The method of claim 1, wherein a plurality of proxy objects are created at various clients, for referencing corresponding remote objects, each residing on a different server.

18. The method of claim 1, wherein at least one of the clients in the system functions as a server to another client by storing a remote object for that other client.

19. The method of claim 1, wherein application logic for the application is distributed across n number of tiers, wherein n represents how many remote objects have been created on computers other than that which the application is currently executing.

20. The method of claim 1, wherein said connecting step includes establishing a connection between the particular client and the particular server using a TCP/IP communication driver.

21. In a distributed computing environment comprising one or more clients connected to one or more servers, a method for partitioning application objects among multiple computers so that objects can be invoked across an arbitrary number of tiers of computers, the method comprising:
 (a) establishing a connection between a particular client and a particular server;
 (b) receiving at the particular client a request to partition application objects by creating an object instance of a particular object which resides at the server;
 (c) in response to the request, partitioning application objects by creating an object instance of the particular object at the particular server and creating a corresponding proxy object for said particular object at the particular client, the proxy object defining properties for the object instance for said particular object and defining an interface for executing methods available to said object instance; and
 (d) executing the application at the particular client by invoking through the proxy object methods available to the object instance.

22. The method of claim 21, wherein steps (a)–(d) are repeated for a plurality of different servers, so that said application objects can be partitioned among an arbitrary number of computers.

23. The method of claim 21, wherein said establishing a connection step includes establishing a connection session between the particular client and the particular server through a communication driver.

24. The method of claim 23, wherein said communication driver is a selected one of TCP/IP and named pipes communication drivers.

25. The method of claim 21, further comprising:
 creating a copy of the object instance at the particular client so that methods available to the object instance can be invoked locally.

26. The method of claim 21, wherein creation of the proxy object at the client occurs at runtime during execution of the application.

27. The method of claim 21, wherein said interface of the proxy object includes names of methods which can be invoked by the object instance.

28. The method of claim 21, wherein step (d) includes:
 transmitting parameter information across a network from the proxy object to the object instance.

29. The method of claim 28, wherein said parameter information includes at least one data value having a data type.

30. The method of claim 28, wherein said transmitting parameter information step includes:
 converting nested data structure information into a flat byte stream suitable for transmission across the network.

31. A system for partitioning and executing an application comprising:
 a client computer for executing a client application, said client computer storing a proxy object defining an interface for a particular object, thereby allowing said client application to communicate with a remote object that is a run-time instance of said particular object;
 a server computer for creating an instance of the remote object, in response to a request from the client application at the proxy object for invoking a method of the remote object; and
 an object manager for establishing a connection between the proxy object and the instance of the remote object and for forwarding requests received at the proxy object for invoking the method available to the instance of the remote object, so that execution of the application is partitioned among any number of computers.

32. The system of claim 31, wherein implementation of the method of the instance of the remote object resides at the server computer.

33. The method of claim 32, wherein said proxy object stores an interface defining methods which can be invoked at the remote object.

34. The system of claim 33, wherein said interface includes information identifying a method by name and characterizing parameters which the method is expected to receive upon invocation.

35. The system of claim 31, wherein methods of the remote object can be invoked with method arguments passed by value or by reference.

* * * * *